United States Patent
Zhang et al.

(10) Patent No.: US 10,550,766 B2
(45) Date of Patent: Feb. 4, 2020

(54) SYSTEM AND METHOD FOR AN IMPROVED INLET SILENCER BAFFLE

(71) Applicant: General Electric Company, Schenectady, NY (US)

(72) Inventors: Hua Zhang, Greer, SC (US); Jianhua Wang, Shanghai (CN); Naveen Ghattadhahalli Parmeshwar, Simpsonville, SC (US); Valery Ivanovich Ponyavin, Greenville, SC (US); Bradly Aaron Kippel, Greenville, SC (US)

(73) Assignee: General Electric Company, Schenectady, NY (US)

( * ) Notice: Subject to any disclaimer, the term of this patent is extended or adjusted under 35 U.S.C. 154(b) by 214 days.

(21) Appl. No.: 15/449,882

(22) Filed: Mar. 3, 2017

(65) Prior Publication Data
US 2018/0195436 A1      Jul. 12, 2018

(30) Foreign Application Priority Data

Jan. 6, 2017    (CN) .......................... 2017 1 0009888

(51) Int. Cl.
  *F02C 7/045*     (2006.01)
(52) U.S. Cl.
  CPC .......... *F02C 7/045* (2013.01); *F05D 2260/30* (2013.01)
(58) Field of Classification Search
  CPC .... F02C 7/045; F01D 25/30; F05D 2240/126; F05D 2260/30; F05D 2260/96
  USPC ................................................ 181/214, 229
  See application file for complete search history.

(56) References Cited

U.S. PATENT DOCUMENTS

| | | |
|---|---|---|
| 1,953,156 A | 4/1934 | Dahlman |
| 2,205,730 A | 6/1940 | Morgan |
| 2,299,112 A | 10/1942 | Schilling |
| 2,519,161 A | 8/1950 | Tucker |
| 2,759,554 A | 8/1956 | Baruch |
| 2,792,906 A | 5/1957 | Evans |
| 2,916,101 A | 12/1959 | Naman |
| 3,019,850 A | 2/1962 | March |
| 3,093,401 A | 6/1963 | Hagendoorn |
| 3,360,910 A | 1/1968 | Soltis |
| 3,423,908 A | 1/1969 | Hart |
| 3,432,999 A | 3/1969 | Schraner |
| 3,487,768 A | 1/1970 | Watson |

(Continued)

FOREIGN PATENT DOCUMENTS

| | | |
|---|---|---|
| CA | 1148874 A1 | 6/1983 |
| CA | 2016596 | 11/1990 |

(Continued)

OTHER PUBLICATIONS

U.S. Appl. No. 15/267,001, filed Sep. 15, 2016, Valery Ivanovich Ponyavin.

(Continued)

*Primary Examiner* — Forrest M Phillips
(74) *Attorney, Agent, or Firm* — Fletcher Yoder, P.C.

(57) ABSTRACT

A system includes a silencer baffle which mounts in a fluid conduit along a fluid flow path. The silencer baffle includes a first baffle section having first and second baffle portions which couple together laterally about a support structure extending between opposite sides of the fluid conduit.

20 Claims, 12 Drawing Sheets

(56) References Cited

U.S. PATENT DOCUMENTS

| | | | |
|---|---|---|---|
| 3,511,337 A * | 5/1970 | Pease | F02C 7/045 |
| | | | 181/214 |
| 3,552,704 A | 1/1971 | Pond | |
| 3,568,790 A * | 3/1971 | Sankey | B64F 1/26 |
| | | | 137/15.1 |
| 3,576,096 A | 4/1971 | Rivers | |
| 3,698,509 A | 10/1972 | Fitting et al. | |
| 3,733,793 A | 5/1973 | Young | |
| 3,740,934 A | 6/1973 | Shuler | |
| 3,750,374 A | 8/1973 | Neumann | |
| 3,759,017 A | 9/1973 | Young | |
| 3,774,946 A | 11/1973 | Hamman | |
| 3,783,768 A | 1/1974 | Caming et al. | |
| 3,820,628 A | 6/1974 | Hanson | |
| 3,837,149 A | 9/1974 | West et al. | |
| 3,859,965 A | 1/1975 | Hatz et al. | |
| 3,860,273 A | 1/1975 | Petrus | |
| 3,891,253 A | 6/1975 | Revell | |
| 3,893,640 A | 7/1975 | Hull, Jr. et al. | |
| 3,916,817 A | 11/1975 | Kemp | |
| 3,926,155 A | 12/1975 | Hatz et al. | |
| 3,949,356 A | 4/1976 | Fuzzell et al. | |
| 3,966,163 A | 6/1976 | Getzin | |
| 3,993,464 A | 11/1976 | Pelabon | |
| 3,999,969 A | 12/1976 | Shuler | |
| 4,050,913 A | 9/1977 | Roach | |
| 4,061,373 A | 12/1977 | Revell | |
| 4,068,736 A | 1/1978 | Dean et al. | |
| 4,167,986 A * | 9/1979 | Conway | F24F 13/24 |
| | | | 181/224 |
| 4,171,211 A | 10/1979 | Garter | |
| 4,178,159 A | 12/1979 | Fecteau | |
| 4,193,844 A | 3/1980 | Neumann et al. | |
| 4,217,122 A | 8/1980 | Shuler | |
| 4,224,765 A | 9/1980 | Song | |
| 4,266,956 A | 5/1981 | Revell | |
| 4,276,069 A | 6/1981 | Miller | |
| 4,316,522 A | 2/1982 | Hirschorn | |
| 4,323,379 A | 4/1982 | Shearin | |
| 4,472,184 A | 9/1984 | Neumann et al. | |
| 4,488,888 A | 12/1984 | Doyle | |
| 4,497,287 A | 2/1985 | Schleiermacher et al. | |
| 4,498,914 A | 2/1985 | Ericksen | |
| 4,519,823 A | 5/1985 | Kinney et al. | |
| 4,521,234 A | 6/1985 | Peebles et al. | |
| 4,555,255 A | 11/1985 | Kissel | |
| 4,569,803 A | 2/1986 | Takakura et al. | |
| 4,600,419 A | 7/1986 | Mattison | |
| 4,608,066 A | 8/1986 | Cadwell, Jr. | |
| 4,632,681 A | 12/1986 | Brunner | |
| 4,648,311 A | 3/1987 | Slosiarek et al. | |
| 4,701,196 A | 10/1987 | Delaney | |
| 4,707,168 A | 11/1987 | Mizutani | |
| 4,710,208 A | 12/1987 | Ziemer et al. | |
| 4,808,203 A | 2/1989 | Sabourin | |
| 4,846,859 A | 7/1989 | Nobiraki et al. | |
| 4,860,420 A | 8/1989 | Cadwell et al. | |
| 4,889,543 A | 12/1989 | Burt | |
| 4,909,208 A | 3/1990 | Kristtics | |
| 4,944,142 A | 7/1990 | Sueshig et al. | |
| 4,946,484 A | 8/1990 | Monson et al. | |
| 4,976,757 A | 12/1990 | Helmus | |
| 4,978,375 A | 12/1990 | Il Yoo | |
| 4,986,050 A | 1/1991 | Brunetti et al. | |
| 5,003,974 A | 4/1991 | Mou | |
| 5,014,608 A | 5/1991 | Benson et al. | |
| 5,056,423 A | 10/1991 | Koukai et al. | |
| 5,062,872 A | 11/1991 | Williams | |
| 5,071,456 A | 12/1991 | Binder et al. | |
| 5,088,299 A | 2/1992 | Peterson | |
| 5,099,374 A | 3/1992 | Ohkita et al. | |
| 5,140,819 A | 8/1992 | Napier et al. | |
| 5,160,293 A | 11/1992 | Koukal et al. | |
| 5,167,683 A | 12/1992 | Behrendt et al. | |
| 5,273,564 A | 12/1993 | Hill | |
| 5,279,632 A | 1/1994 | Decker et al. | |
| 5,286,201 A | 2/1994 | Yu | |
| 5,291,355 A | 3/1994 | Hatch et al. | |
| 5,295,602 A | 3/1994 | Swanson | |
| 5,313,759 A | 5/1994 | Chase, III | |
| 5,331,748 A | 7/1994 | Miller, Jr. | |
| 5,332,409 A | 7/1994 | Dralle | |
| 5,358,379 A * | 10/1994 | Pepperman | B23P 6/005 |
| | | | 415/191 |
| 5,379,609 A | 1/1995 | Matsumoto et al. | |
| 5,394,786 A | 3/1995 | Gettle | |
| 5,417,205 A | 5/1995 | Wang | |
| 5,417,610 A | 5/1995 | Spransy | |
| 5,421,307 A | 6/1995 | Andress et al. | |
| 5,422,795 A | 6/1995 | Liu | |
| 5,454,756 A | 10/1995 | Ludwig | |
| 5,458,772 A | 10/1995 | Eskes et al. | |
| 5,473,123 A * | 12/1995 | Yazici | F24F 7/08 |
| | | | 181/224 |
| 5,491,308 A | 2/1996 | Napier et al. | |
| 5,512,074 A | 4/1996 | Hanni et al. | |
| 5,512,086 A | 4/1996 | Glucksman | |
| 5,514,197 A | 5/1996 | Den | |
| 5,532,439 A | 7/1996 | Minkin | |
| 5,554,203 A | 9/1996 | Borkent et al. | |
| 5,575,826 A | 9/1996 | Gillingham et al. | |
| 5,601,626 A | 2/1997 | Hori et al. | |
| 5,602,700 A | 2/1997 | Viskochil et al. | |
| 5,617,825 A | 4/1997 | Altmann et al. | |
| 5,637,124 A | 6/1997 | Diachuk | |
| 5,655,825 A | 8/1997 | Anoszko | |
| 5,669,947 A | 9/1997 | Diachuk | |
| 5,725,624 A | 3/1998 | Ernst et al. | |
| 5,733,348 A | 3/1998 | Skarsten | |
| 5,753,002 A | 5/1998 | Glucksman | |
| 5,759,239 A | 6/1998 | Yu | |
| 5,788,729 A | 8/1998 | Jurgensmeyer | |
| 5,797,975 A | 8/1998 | Davis | |
| 5,820,235 A | 10/1998 | Tsai | |
| 5,824,125 A | 10/1998 | Sherwood | |
| 5,833,727 A | 11/1998 | Sharsten | |
| 5,871,556 A | 2/1999 | Jeanseau et al. | |
| 5,904,744 A | 5/1999 | Kagan | |
| 5,984,991 A | 11/1999 | Glucksman | |
| 6,001,145 A | 12/1999 | Hammes | |
| 6,099,612 A | 8/2000 | Bartos | |
| 6,117,202 A | 9/2000 | Wetzel | |
| 6,149,701 A | 11/2000 | Ellingson | |
| 6,152,980 A | 11/2000 | Culwell | |
| 6,190,431 B1 | 2/2001 | Jeanseau et al. | |
| 6,260,658 B1 | 7/2001 | Darrell et al. | |
| 6,264,713 B1 | 7/2001 | Lewis, II | |
| 6,267,793 B1 | 7/2001 | Gomez et al. | |
| 6,270,546 B1 | 8/2001 | Jeanseau et al. | |
| 6,293,983 B1 | 9/2001 | More | |
| 6,309,296 B1 | 10/2001 | Schwenk et al. | |
| 6,312,327 B1 | 11/2001 | Hachmann et al. | |
| 6,319,300 B1 | 11/2001 | Chen | |
| 6,337,782 B1 | 1/2002 | Guerin et al. | |
| 6,339,521 B1 | 1/2002 | Durrum et al. | |
| 6,351,920 B1 | 3/2002 | Hopkins et al. | |
| 6,361,578 B1 | 3/2002 | Rubinson | |
| 6,362,937 B1 | 3/2002 | Gibbs et al. | |
| 6,371,846 B1 | 4/2002 | Powell et al. | |
| 6,447,566 B1 | 9/2002 | Rivera et al. | |
| 6,451,079 B1 | 9/2002 | Lange et al. | |
| 6,485,538 B1 | 11/2002 | Toyoshima | |
| 6,497,739 B2 | 12/2002 | McGill | |
| 6,554,880 B1 | 4/2003 | Northcutt | |
| 6,716,267 B2 | 4/2004 | Lawlor | |
| 6,736,238 B2 | 5/2004 | Kerr | |
| 6,858,055 B2 | 2/2005 | McGill | |
| 7,077,835 B2 | 7/2006 | Robinson et al. | |
| 7,097,692 B2 | 8/2006 | Southland et al. | |
| 7,108,251 B2 | 9/2006 | Mueller | |
| 7,117,910 B2 | 10/2006 | Akahori | |
| 7,128,771 B2 | 10/2006 | Harden | |
| 7,258,196 B2 | 8/2007 | Radatus et al. | |
| 7,261,757 B2 | 8/2007 | Duffy | |

(56) References Cited

U.S. PATENT DOCUMENTS

| | | |
|---|---|---|
| 7,323,028 B2 | 1/2008 | Simmons |
| 7,332,012 B2 | 2/2008 | O'Connor |
| 7,410,520 B2 | 8/2008 | Nowak |
| 7,413,587 B2 | 8/2008 | Beier |
| 7,422,613 B2 | 9/2008 | Bockle et al. |
| 7,452,396 B2 | 11/2008 | Terlson et al. |
| 7,537,630 B2 | 5/2009 | Schuld et al. |
| 7,581,619 B1 | 9/2009 | Storm |
| 7,588,618 B2 | 9/2009 | Osborne et al. |
| 7,588,629 B2 | 9/2009 | Osborne et al. |
| 7,662,216 B1 | 2/2010 | Terres et al. |
| 7,670,401 B2 | 3/2010 | Whittemore |
| 7,686,869 B2 | 3/2010 | Wiser et al. |
| 7,776,122 B2 | 8/2010 | Feldmann |
| 7,901,476 B2 | 3/2011 | Kao |
| 7,901,479 B2 | 3/2011 | Osborne et al. |
| 7,972,401 B2 | 7/2011 | Stock et al. |
| 7,976,604 B2 | 7/2011 | Desjardins |
| 8,048,186 B2 | 11/2011 | Mann et al. |
| 8,052,770 B2 | 11/2011 | Ayshford et al. |
| 8,087,491 B2 | 1/2012 | Merchant et al. |
| 8,105,409 B2 | 1/2012 | Mann et al. |
| 8,240,427 B2 | 8/2012 | Jangili et al. |
| 8,240,429 B1* | 8/2012 | Singhal ............... H02K 5/20 181/212 |
| 8,579,074 B2 | 11/2013 | Kosaka et al. |
| 8,714,303 B2* | 5/2014 | Honji ............... E04B 1/8209 181/214 |
| 9,309,842 B2 | 4/2016 | Watson et al. |
| 9,534,725 B1 | 1/2017 | Tecson et al. |
| 10,119,469 B2* | 11/2018 | Ponyavin ............... F02C 7/045 |
| 2002/0134061 A1 | 9/2002 | McGill |
| 2002/139098 A1 | 10/2002 | Beier |
| 2003/0075923 A1 | 4/2003 | Lepoutre |
| 2004/0025996 A1 | 2/2004 | Akahori |
| 2005/0044828 A1 | 3/2005 | Southland et al. |
| 2005/0173815 A1 | 8/2005 | Mueller |
| 2005/0194206 A1* | 9/2005 | Rose ............... G10K 15/04 181/224 |
| 2005/0204713 A1 | 9/2005 | Wu et al. |
| 2005/0279064 A1 | 12/2005 | Simmons |
| 2005/0284113 A1 | 12/2005 | Jang et al. |
| 2006/0059828 A1 | 3/2006 | Stevenson et al. |
| 2006/0091243 A1 | 5/2006 | Hoffmann |
| 2006/0121768 A1 | 6/2006 | Dworatzek et al. |
| 2006/0168925 A1 | 8/2006 | Whittemore |
| 2007/0044441 A1 | 3/2007 | Troxell et al. |
| 2007/0084168 A1 | 4/2007 | Ashwood et al. |
| 2007/0169448 A1 | 7/2007 | Osborne et al. |
| 2007/0199289 A1 | 8/2007 | Bland, Jr. |
| 2007/0199449 A1 | 8/2007 | Wiser et al. |
| 2007/0204576 A1 | 9/2007 | Terlson et al. |
| 2007/0220851 A1 | 9/2007 | Parker et al. |
| 2007/0220854 A1 | 9/2007 | Feldmann |
| 2008/0184996 A1 | 8/2008 | Colorado |
| 2009/0113862 A1 | 5/2009 | Connor et al. |
| 2009/0320426 A1 | 12/2009 | Braunecker et al. |
| 2010/0139225 A1 | 6/2010 | Mammarella et al. |
| 2010/0192528 A1 | 8/2010 | Mann et al. |
| 2010/0229514 A1 | 9/2010 | Ayshford et al. |
| 2010/0251678 A1 | 10/2010 | Mann et al. |
| 2010/0251681 A1 | 10/2010 | Gebert |
| 2010/0263964 A1* | 10/2010 | Kosaka ............... F02C 7/045 181/214 |
| 2011/0061968 A1 | 3/2011 | Helenius et al. |
| 2012/0297783 A1 | 11/2012 | Melton et al. |
| 2013/0168180 A1 | 7/2013 | Merchant et al. |
| 2014/0212265 A1 | 7/2014 | Putnam |
| 2016/0010557 A1* | 1/2016 | Matsuyama ............ F01D 25/30 60/805 |
| 2017/0174356 A1 | 6/2017 | Lucas |
| 2018/0195435 A1* | 7/2018 | Zhang ............... F02C 7/045 |
| 2018/0223733 A1* | 8/2018 | Zhang ............... F02C 7/045 |

FOREIGN PATENT DOCUMENTS

| | | |
|---|---|---|
| CA | 1322535 A1 | 9/1993 |
| CA | 2147206 A1 | 10/1995 |
| CA | 2204538 C | 3/2001 |
| CA | 2479329 A1 | 3/2005 |
| CA | 2496056 A1 | 10/2005 |
| CA | 2551701 | 12/2006 |
| CA | 2512414 | 1/2007 |
| CA | 2565992 | 4/2007 |
| CA | 2227816 C | 8/2007 |
| CA | 2602631 | 3/2008 |
| CN | 1169382 A | 1/1998 |
| CN | 1752553 A | 3/2006 |
| CN | 1932278 | 3/2007 |
| CN | 1963166 A | 5/2007 |
| DE | 4211303 A1 | 10/1993 |
| DE | 4412474 A1 | 10/1995 |
| DE | 4438007 A1 | 5/1996 |
| DE | 4412474 C2 | 8/1997 |
| DE | 10002343 A1 | 7/2000 |
| DE | 20216538 U1 | 2/2003 |
| DE | 20218457 U1 | 3/2003 |
| DE | 10332984 A1 | 2/2005 |
| DE | 10339082 A1 | 3/2005 |
| DE | 102005031501 A1 | 1/2007 |
| DE | 102006056225 A1 | 6/2008 |
| EP | 0065064 A2 | 11/1982 |
| EP | 0065064 A3 | 1/1984 |
| EP | 0065064 B1 | 11/1986 |
| EP | 0225448 A1 | 6/1987 |
| EP | 0232640 A1 | 8/1987 |
| EP | 0318636 A1 | 6/1989 |
| EP | 0398091 A1 | 11/1990 |
| EP | 0453657 A2 | 10/1991 |
| EP | 0453657 A3 | 10/1992 |
| EP | 0318636 B1 | 11/1992 |
| EP | 0555761 A1 | 8/1993 |
| EP | 0560298 A2 | 9/1993 |
| EP | 0620133 A1 | 10/1994 |
| EP | 0634203 A2 | 1/1995 |
| EP | 0634203 A3 | 4/1995 |
| EP | 0560298 A3 | 8/1995 |
| EP | 0398091 B1 | 1/1996 |
| EP | 0699465 A2 | 3/1996 |
| EP | 0555761 B1 | 4/1996 |
| EP | 0699465 A3 | 5/1996 |
| EP | 0735266 A1 | 10/1996 |
| EP | 0765517 A1 | 10/1996 |
| EP | 0620133 B1 | 9/1997 |
| EP | 0765517 A4 | 1/1998 |
| EP | 0818337 A2 | 1/1998 |
| EP | 0634203 B1 | 8/1998 |
| EP | 0856093 A1 | 8/1998 |
| EP | 0560298 B1 | 6/1999 |
| EP | 0951335 A1 | 10/1999 |
| EP | 0818337 A3 | 12/1999 |
| EP | 0699465 B1 | 2/2001 |
| EP | 0765517 B1 | 5/2001 |
| EP | 1184268 A2 | 3/2002 |
| EP | 0818337 B1 | 8/2002 |
| EP | 0951335 B1 | 5/2003 |
| EP | 1184268 A3 | 10/2003 |
| EP | 1184268 B1 | 10/2007 |
| EP | 1884277 A1 | 2/2008 |
| EP | 3144489 A1 | 3/2017 |
| FR | 2823989 A1 | 10/2002 |
| FR | 2823989 B1 | 7/2003 |
| GB | 682845 | 11/1952 |
| GB | 724179 | 2/1955 |
| GB | 759992 | 10/1956 |
| GB | 1045309 A | 10/1966 |
| GB | 1072791 | 6/1967 |
| GB | 1082503 | 9/1967 |
| GB | 1104643 A | 2/1968 |
| GB | 1190959 | 5/1970 |
| GB | 1367734 A | 9/1974 |
| GB | 2302292 A | 1/1997 |
| GB | 2302292 B | 2/1998 |

(56) References Cited

FOREIGN PATENT DOCUMENTS

| | | |
|---|---|---|
| GB | 2340596 A | 2/2000 |
| GB | 2340596 B | 7/2002 |
| GB | 2415398 A | 12/2005 |
| GB | 2415398 B | 7/2008 |
| JP | 57007219 A2 | 1/1982 |
| JP | 57031738 A2 | 2/1982 |
| JP | 60060433 A2 | 4/1985 |
| JP | 60060435 A2 | 4/1985 |
| JP | 60066811 U1 | 5/1985 |
| JP | 61240039 A2 | 10/1986 |
| JP | 63009742 A2 | 1/1988 |
| JP | 2140525 | 5/1990 |
| JP | 2252185 A2 | 10/1990 |
| JP | 3207935 | 9/1991 |
| JP | 5141645 A2 | 6/1993 |
| JP | 5141689 | 6/1993 |
| JP | 7098149 A2 | 4/1995 |
| JP | 8224417 A2 | 9/1996 |
| JP | 8226574 A2 | 9/1996 |
| JP | 9075640 | 3/1997 |
| JP | 9155158 A2 | 6/1997 |
| JP | 9173892 A2 | 7/1997 |
| JP | 9184656 A2 | 7/1997 |
| JP | 9287812 A2 | 11/1997 |
| JP | 9330557 A2 | 12/1997 |
| JP | 11059861 | 3/1999 |
| JP | 11169614 A2 | 6/1999 |
| JP | 2001227814 | 8/2001 |
| JP | 2002210426 | 7/2002 |
| JP | 2003190049 A2 | 7/2003 |
| JP | 2003334410 | 11/2003 |
| JP | 2004167323 A2 | 6/2004 |
| JP | 2005103356 A2 | 4/2005 |
| JP | 2006003002 A2 | 1/2006 |
| JP | 2006132895 A2 | 5/2006 |
| JP | 2006305508 A2 | 11/2006 |
| JP | 2007046588 A2 | 2/2007 |
| JP | 2007132607 A2 | 5/2007 |
| JP | 2007296481 A2 | 11/2007 |
| KR | 20010048149 A | 6/2001 |
| KR | 20020025646 A | 4/2002 |
| KR | 20020055182 A | 7/2002 |
| KR | 20030034003 A | 5/2003 |
| KR | 20030079893 A | 10/2003 |
| KR | 20030093063 A | 12/2003 |
| KR | 20040076781 A | 9/2004 |
| MX | 9601164 A | 2/1997 |
| MX | PA02011936 A | 6/2004 |
| MX | PA05007008 A | 2/2006 |
| RO | 117217 B1 | 11/2001 |
| RO | 118492 B1 | 5/2003 |
| RU | 2130521 C1 | 5/1999 |
| RU | 2209736 C2 | 8/2003 |
| RU | 2236122 C1 | 9/2004 |
| SK | 280735 B6 | 7/2000 |
| TW | I247078 B | 1/2006 |
| WO | WO 89/07225 A1 | 8/1989 |
| WO | WO 9105157 A1 | 4/1991 |
| WO | WO 96/32714 A1 | 10/1996 |
| WO | WO 98/07949 A1 | 2/1998 |
| WO | WO 01/81740 A1 | 11/2001 |
| WO | WO 02/066272 A2 | 8/2002 |
| WO | WO 2005/076922 A2 | 8/2005 |
| WO | WO 2005/076922 A3 | 8/2005 |
| WO | WO 2006/080689 A1 | 8/2006 |
| WO | WO 2007/042194 A1 | 4/2007 |
| WO | WO 2008/030138 A2 | 3/2008 |
| WO | WO 2008/030138 A3 | 3/2008 |
| WO | WO 2008/068327 A1 | 6/2008 |

OTHER PUBLICATIONS

U.S. Appl. No. 15/267,019, filed Sep. 15, 2016, Naveen Ghattadhahalli Parmeshwar.
U.S. Appl. No. 15/449,874, filed Mar. 3, 2017, Hua Zhang.
Extended European Search Report and Opinion issued in connection with corresponding EP Application No. 17189903.2 dated Jan. 30, 2018.

\* cited by examiner

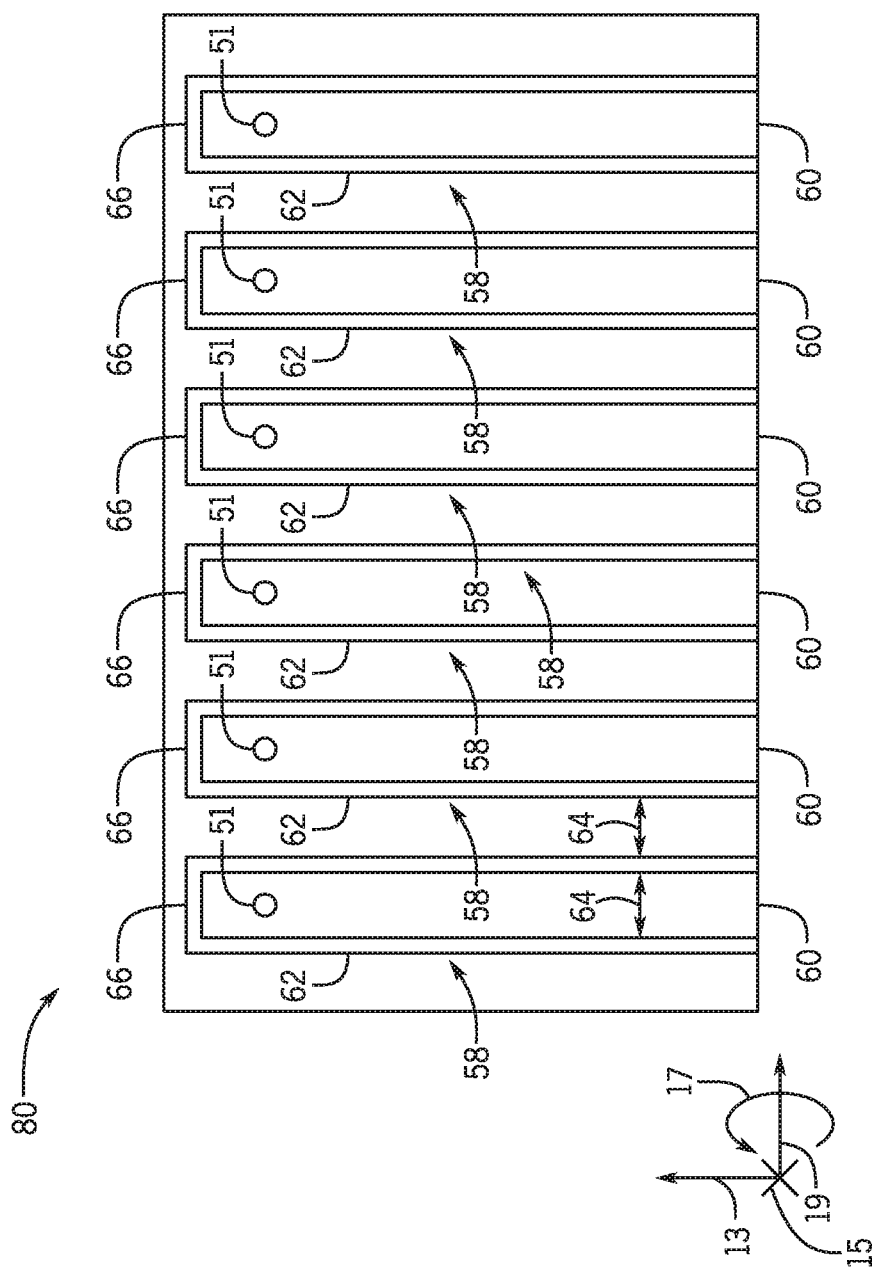

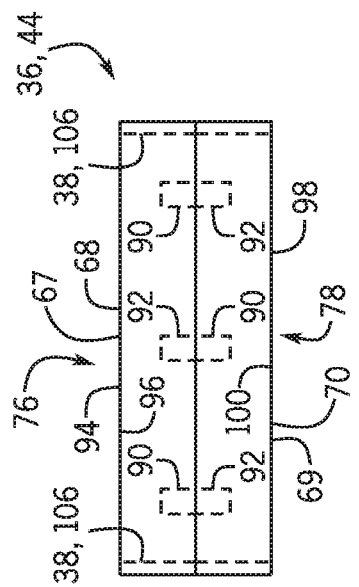
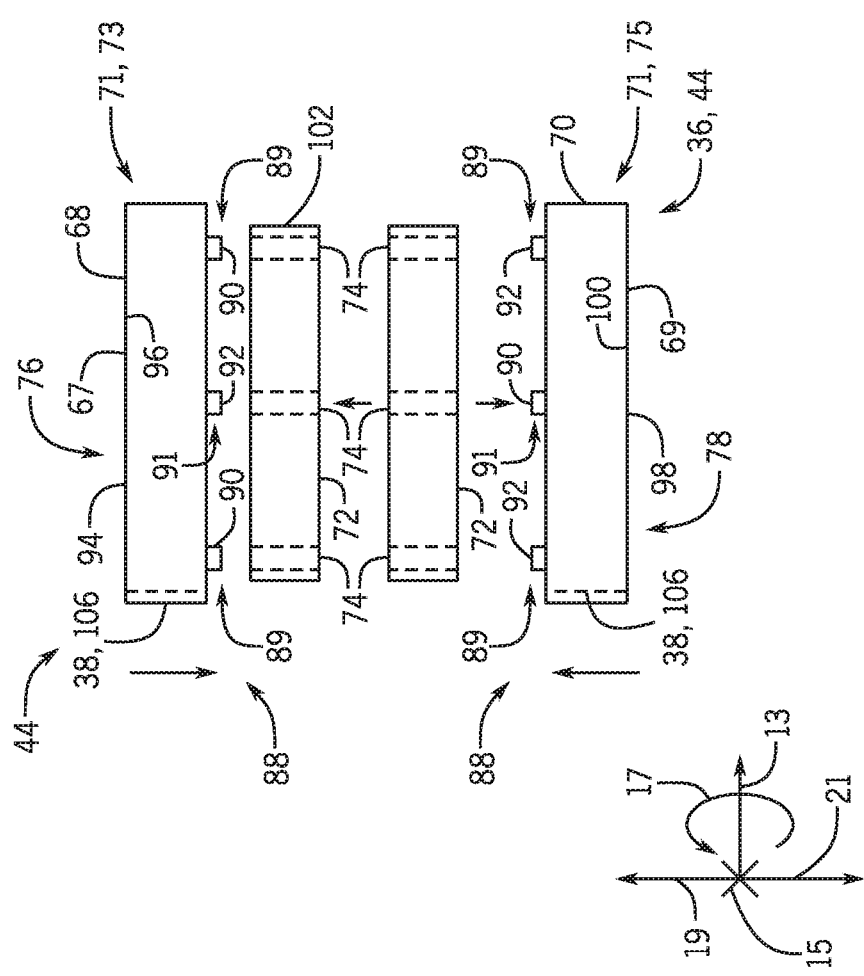

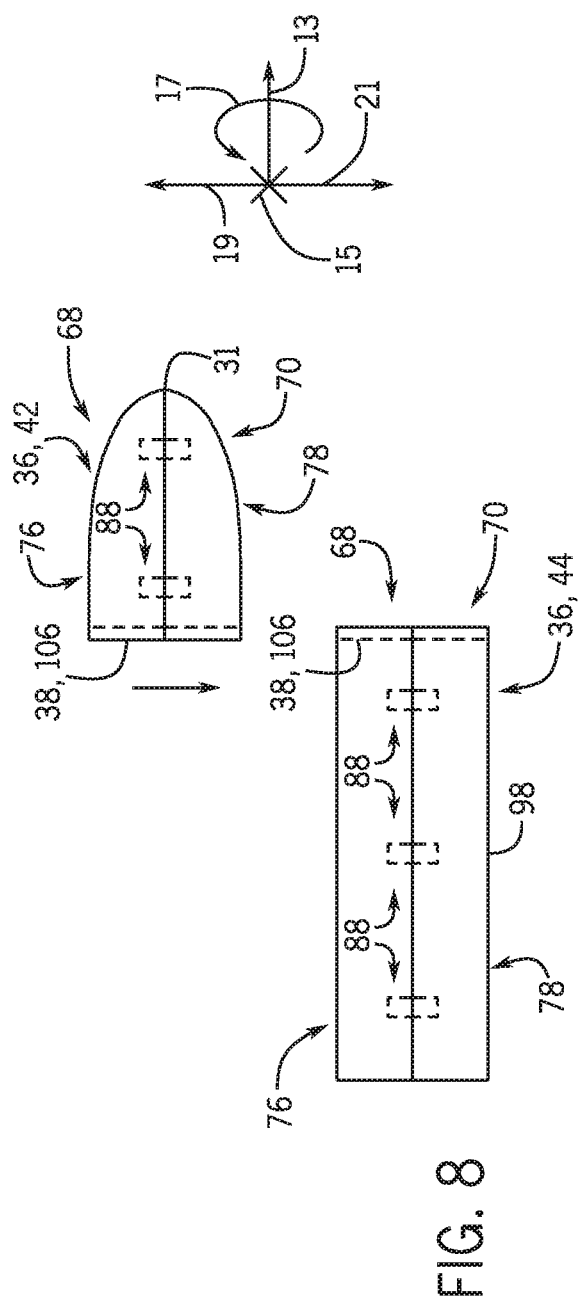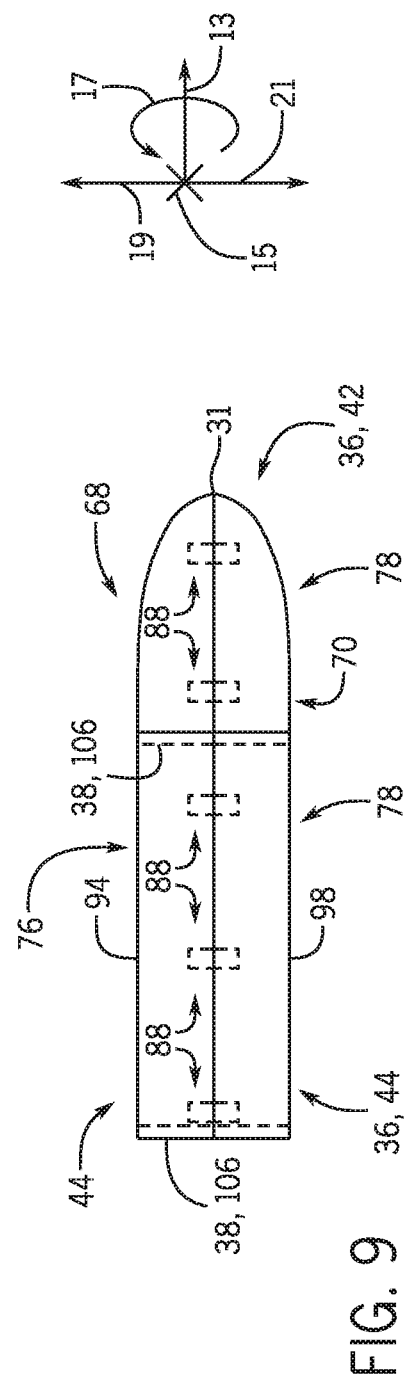

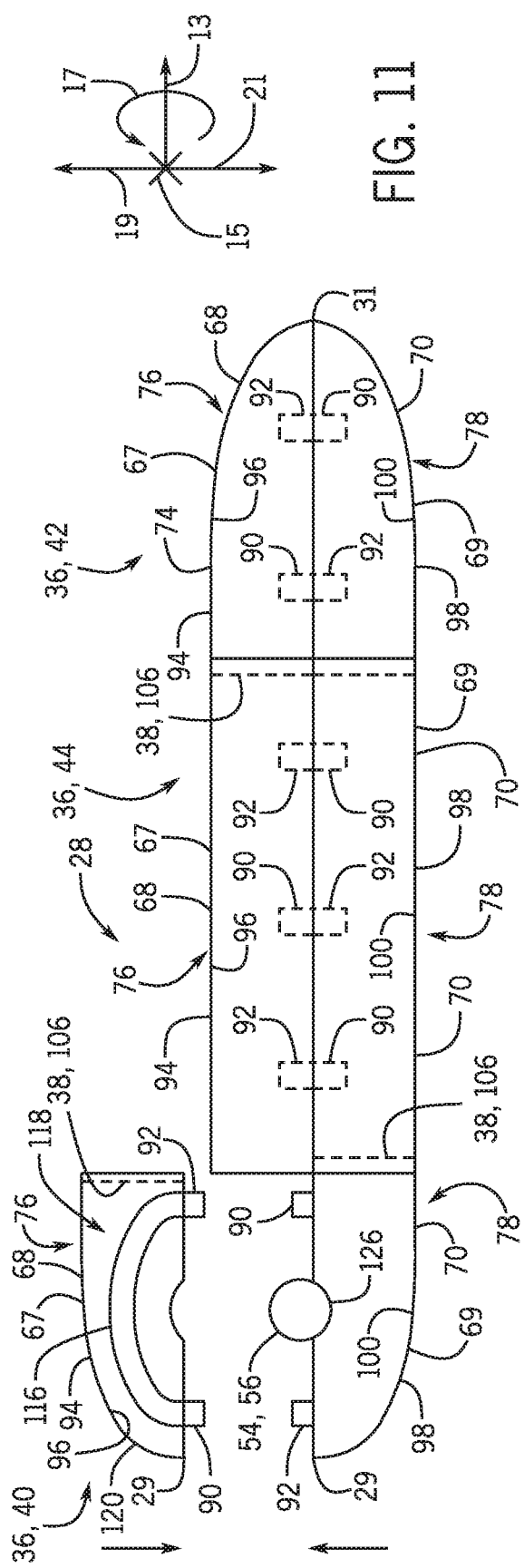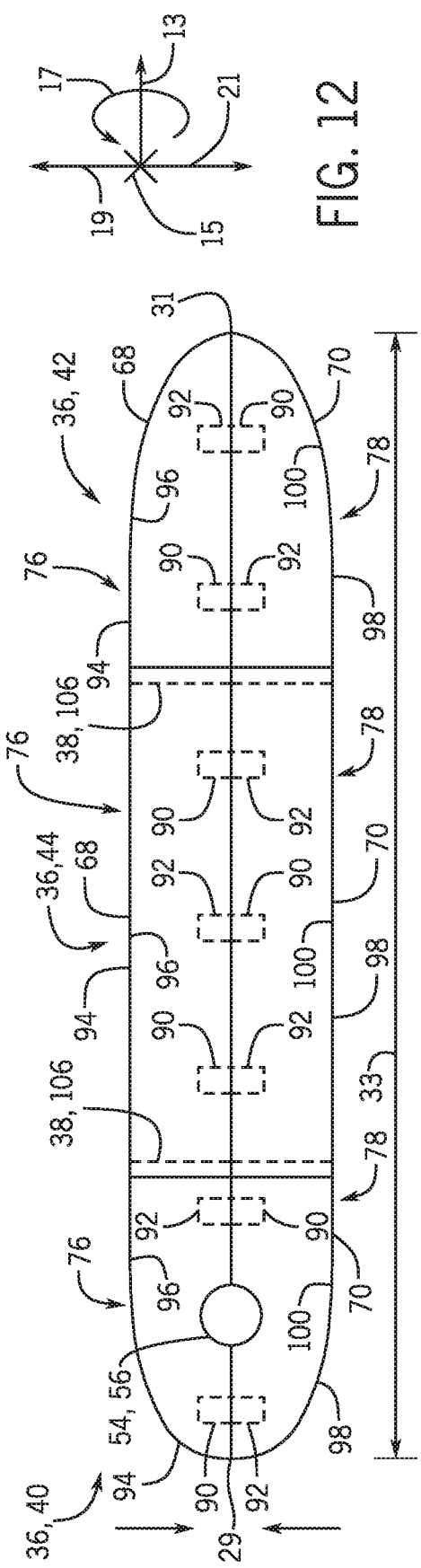

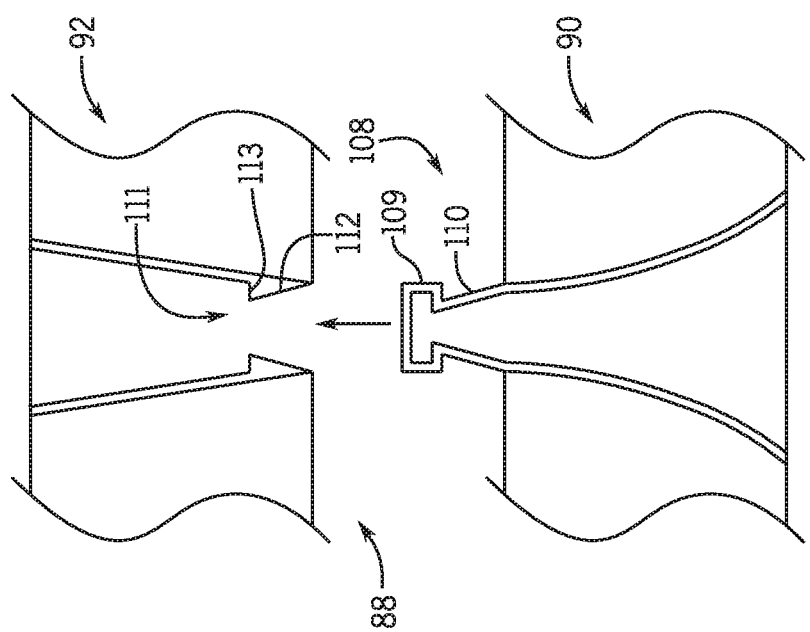
FIG. 15
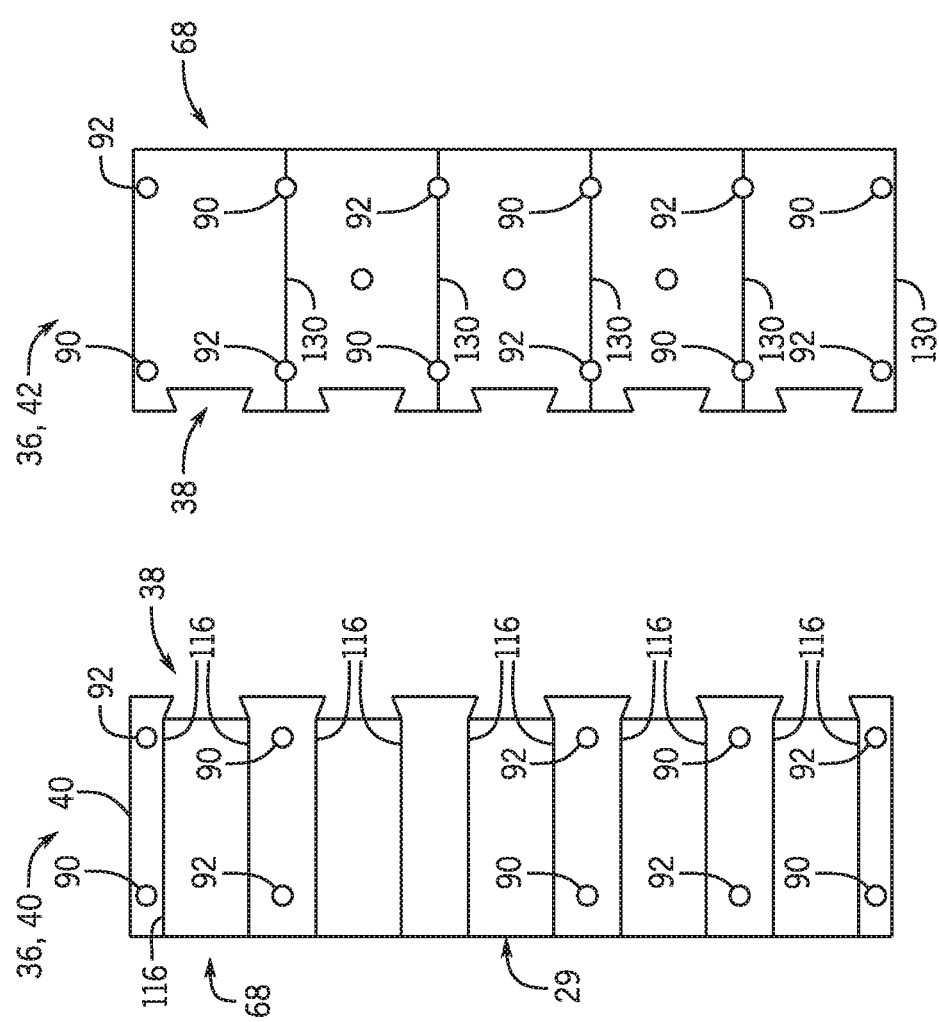
FIG. 14
FIG. 13

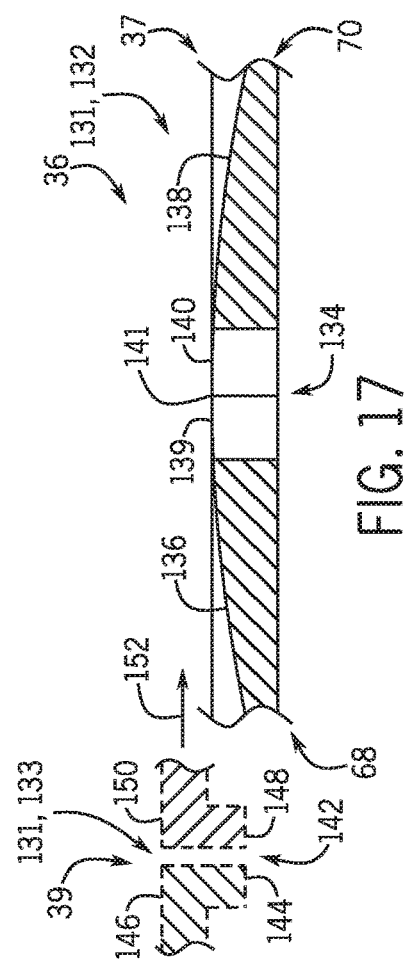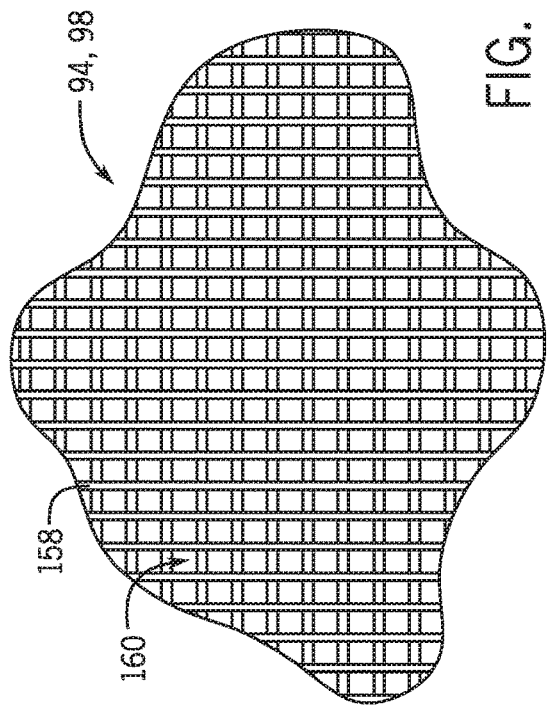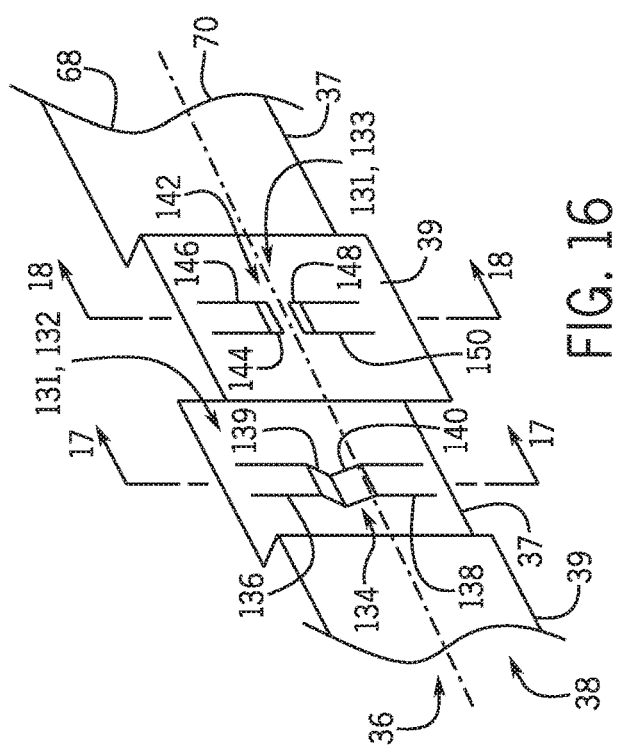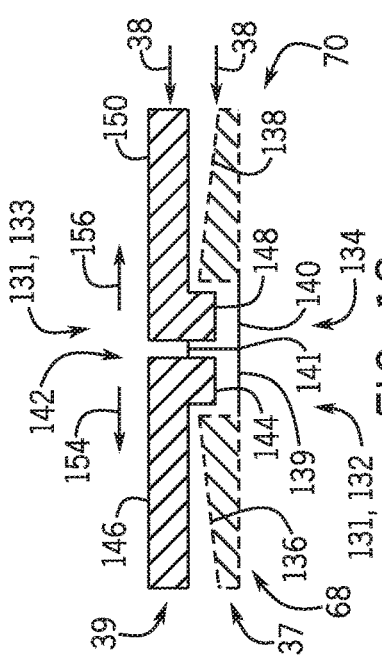

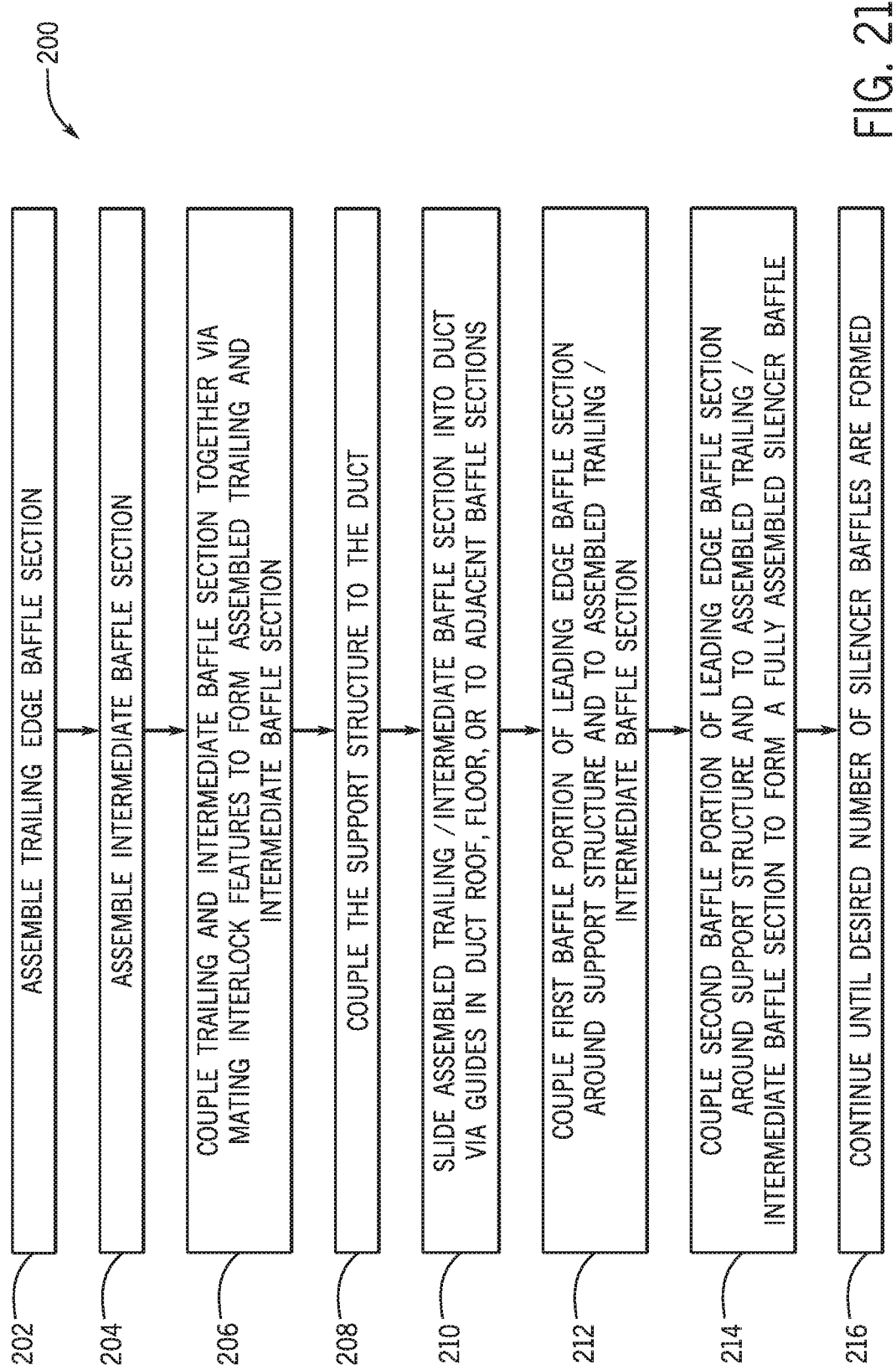

SYSTEM AND METHOD FOR AN IMPROVED INLET SILENCER BAFFLE

CROSS-REFERENCE TO RELATED APPLICATIONS

This application claims priority to and benefit of Chinese Patent Application No. 201710009888.9, entitled "SYSTEM AND METHOD FOR AN IMPROVED INLET SILENCER BAFFLE", filed Jan. 6, 2017, which is herein incorporated by reference in its entirety.

BACKGROUND

The subject matter disclosed herein relates to systems and methods for silencing noise within an air duct for a gas turbine engine.

Power generation equipment, such as a gas turbine engine, can use a large supply of intake air to support the combustion process. To maintain suitable performance of the turbine, the intake air is filtered to remove unwanted dust, moisture, and other contaminants before the air is compressed in a compressor. The large volume of air that moves through the intake air housing and a large air duct acts as a conduit for significant acoustical energy generated by the gas turbine compressor blades, which may contribute to excess noise.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In a first embodiment, a system includes a silencer baffle which mounts in a fluid conduit along a fluid flow path, where the silencer baffle includes a plurality of baffle sections, and at least two baffle sections of the plurality of baffle sections couple together via mating interlock structures. The system includes at least one baffle section of the plurality of baffle sections which has first and second baffle portions which couple together via mating joints.

In a second embodiment, a system includes a silencer baffle which mounts in a fluid conduit along a fluid flow path, where the silencer baffle includes first and second baffle portions which couple together about a support structure extending between opposite sides of the fluid conduit.

In a third embodiment, a system includes a silencer baffle which mounts in a fluid conduit along a fluid flow path, where the silencer baffle includes first and second baffle portions which couple together about an interior chamber, and a sound absorption material disposed in the interior chamber.

BRIEF DESCRIPTION OF THE DRAWINGS

These and other features, aspects, and advantages of the present claimed subject matter will become better understood when the following detailed description is read with reference to the accompanying drawings in which like characters represent like parts throughout the drawings, wherein:

FIG. 3 is a cross-sectional view of an embodiment of a panel having a plurality of guide rails disposed on a side of a fluid conduit taken along line 3-3 of FIGS. 1-2;

FIG. 6 is a cross-sectional view of an embodiment of an intermediate section of the silencer baffle taken along line 4-4 of FIGS. 1-2 prior to assembly;

FIG. 7 is a cross-sectional view of an embodiment of the intermediate section of the silencer baffle taken along line 4-4 of FIGS. 1-2 after assembly;

FIG. 8 is a cross-sectional view of an embodiment of the trailing edge section and the intermediate section of the silencer baffle taken along line 4-4 of FIGS. 1-2 before the trailing edge section and the intermediate section are coupled together;

FIG. 9 is a cross-sectional view of an embodiment of the trailing edge section and the intermediate section of the silencer baffle taken along line 4-4 of FIGS. 1-2 after the trailing edge section and the intermediate section are coupled together;

FIG. 11 is a cross-sectional view of an embodiment of the leading edge section of the silencer baffle taken along line 4-4 of FIGS. 1-2 after a first baffle portion of the leading edge section has been coupled to the assembled intermediate section and trailing edge section of FIG. 9 around a support structure;

FIG. 12 is a cross-sectional view of an embodiment of the leading edge section of the silencer baffle taken along line 4-4 of FIGS. 1-2 after a second baffle portion of the leading edge section has been coupled to the assembled intermediate section and trailing edge section of FIG. 9 around the support structure;

FIG. 13 is a cross-sectional view of an embodiment of the first baffle portion of the leading edge section of the silencer baffle taken along line 13-13 of FIG. 2 illustrating the plurality of male and female joints;

FIG. 14 is a cross-sectional view of an embodiment of the first baffle portion of the trailing edge section of the silencer baffle taken along line 14-14 of FIG. 2 illustrating the plurality of male and female joints;

FIG. 15 is a partial cross-sectional view of an embodiment of the male and the female joints used to couple the baffle portions together;

FIG. 16 is a partial perspective view of a baffle section illustrating an embodiment of a dovetail lock utilized between the baffle sections of FIG. 1;

FIG. 17 is a partial cross-sectional view of an embodiment of the dovetail lock taken within line 17-17 of FIG. 16;

FIG. 18 is a partial cross-sectional view of an embodiment of the dovetail lock taken within line 18-18 of FIG. 16;

FIG. 19 is a close-up view of an embodiment of an exterior surface of a baffle section of the silencer baffle;

FIG. 21 illustrates a method of installing the silencer baffles in accordance with the embodiments disclosed herein.

DETAILED DESCRIPTION

Figure 1:
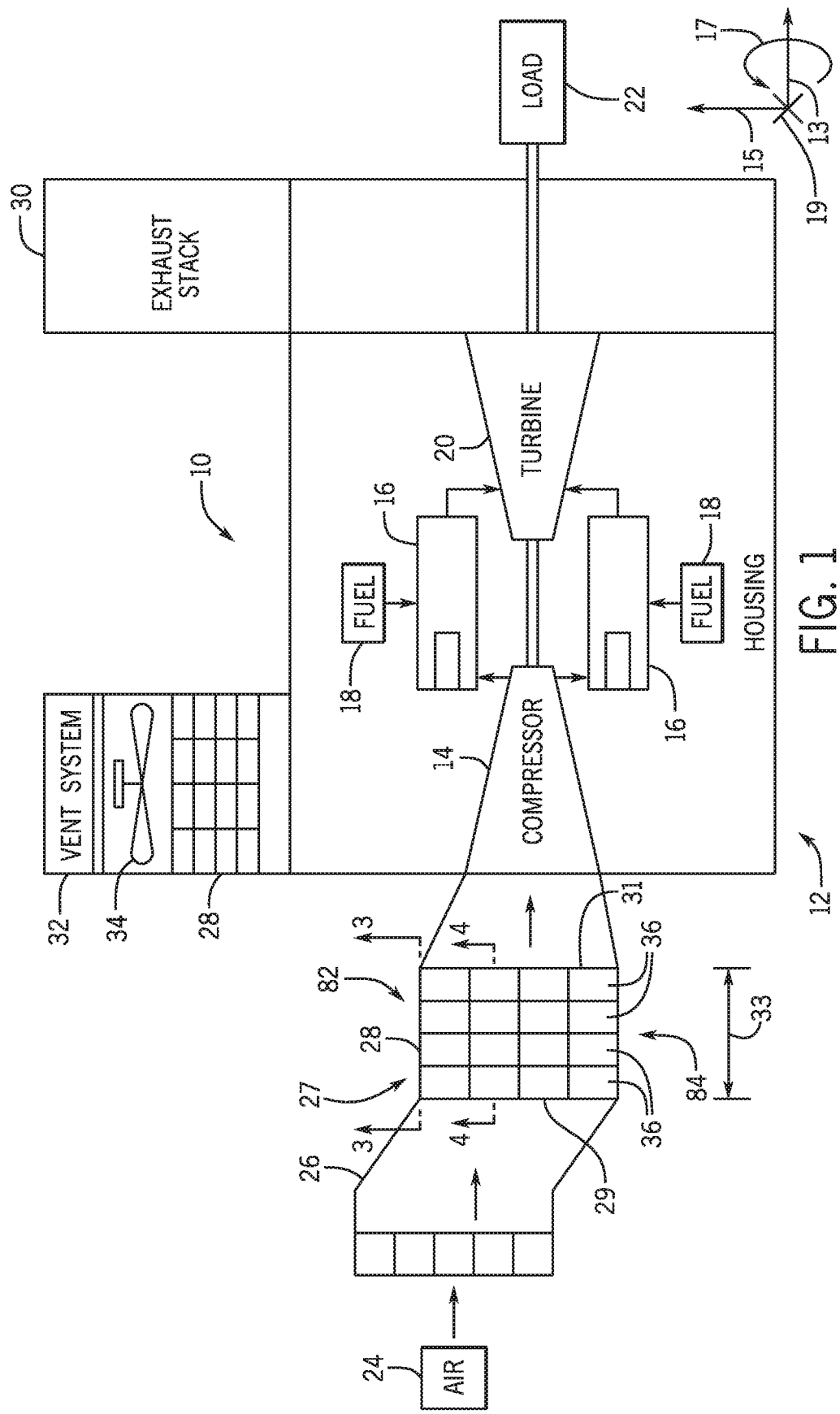
FIG. 1 is a schematic diagram of an embodiment of a power generation system with a silencer baffle having a plurality of modularized baffle sections disposed within an air duct of an inlet housing.

One or more specific embodiments of the present claimed subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present claimed subject matter, the articles "a," "an," "the," and "said" are intended to mean that there are one or more of the elements. The terms "comprising," "including," and "having" are intended to be inclusive and mean that there may be additional elements other than the listed elements.

Embodiments of the claimed subject matter include a power generation system including a gas turbine engine, where the system includes a conduit (e.g., an intake or exhaust housing and duct) for flowing a fluid (e.g., air, recirculated exhaust gas, etc.) to a compressor. One or more silencer baffles (e.g., 1, 2, 3, 4, 5, 6, 7, 8, 9, or 10) parallel baffles may be disposed in the housing or duct (e.g., intake or exhaust). Each silencer baffle includes a plurality of baffle sections aligned substantially linearly with one another. The baffle sections are coupled together via a lockable coupling, such as mating interlock structures. The mating interlock structures may include a female joint portion and a male joint portion that secure adjacent baffle sections together when coupled. The male and female joint portions are mirrored in location in the configuration of a baffle section, so that they may be coupled (e.g., locked) together. The baffle sections may be produced by one injection mold. For example, the mating interlock structures may include mating rail portions, mating dovetail joints, mating hook and slot joints, mating latches, mating snap-fit couplings, or any combination thereof. Two or more baffle sections are assembled to form a silencer baffle. The baffle sections of the silencer baffle may form a plurality of rows and columns when assembled and installed into the inlet air housing and/or air duct. The baffle sections may be used within an intake section (e.g., intake section, exhaust gas recirculation, intake section, etc.), an exhaust system, or any other suitable flow path (e.g., gas flow paths with suitable temperatures) of the power generation system.

Each of the baffle sections may be formed by coupling first and second baffle portions together via male and female mating joints. As may be appreciated, the male and the female joints may be in the form of dove tail joints. Each of the baffle portions may have an interior chamber. A sound absorption insert may be inserted into the interior chamber to absorb noise. The sound absorption inserts may have openings to fit over the male and female mating joints structural ribs or supports, and other internal features. One or more of the baffle sections (e.g., a leading edge baffle section) may be formed around a support structure (e.g., a rod or a pipe). The rod may be secured to the duct panels by a suitable method, such as welding. The baffle sections may be formed by coupling the mating joints together to form each baffle section (e.g., a leading edge baffle section, a trailing edge baffle section, and an intermediate section). The trailing edge baffle section and the intermediate section may be coupled together via mating interlock features to form an assembled intermediate and trailing edge section. The assembled intermediate and trailing edge sections may be installed into the duct via one or more rail guides. The leading edge baffle section may then be formed by coupling the first baffle portion of the leading edge baffle section to the assembled intermediate and trailing edge section. The first baffle portion may also be installed around a support structure (e.g., rod or a pipe). The second baffle portion of the leading edge baffle section may then be coupled to the assembled intermediate and trailing edge section. The second baffle portion may also be installed around a support structure (e.g., rod or a pipe) and to the first baffle portion of the leading edge baffle section to form a fully assembled silencer baffle.

The perimeter of the silencer baffle gradually curves (e.g., tapers) from the leading baffle section to the trailing section, creating a more aerodynamic shape (e.g., an airfoil shaped baffle). An exterior baffle shell (e.g., outer wall or surface) of the silencer baffle may also include one or more patterns. The patterns may include recesses and/or protrusions (e.g., dimples) and allow noise to be absorbed by acoustic materials (e.g., sound absorption materials) disposed within the baffle shell.

Turning now to the drawings, FIG. 1 is a schematic diagram of an embodiment of a power generation system 10 with a silencer baffle 28 including a plurality of baffle sections 36 disposed within an inlet air housing 26 having an intake duct or fluid conduit 27 (e.g., air duct) that uses modularized silencer baffle sections 36 disclosed herein. In the following discussion, reference may be made to various directions, including an axial direction or axis 13, a radial direction or axis 15, a circumferential direction or axis 17 and/or laterally 19. The power generation system 10 includes a gas turbine engine 12 having a compressor 14 and one or more combustors 16 to receive and combust a mixture of compressed oxidant (e.g., air 24) and fuel 18, and one or more turbines 20 driven by hot gases produced by combustion of the air-fuel mixture.

The hot combustion gases drive the turbine 20, which in turn drives the compressor 14 and one or more other loads 22. For example, in the illustrated embodiment, the gas turbine engine 12 may be coupled to a variety of loads 22, such as an electrical generator. After driving the turbine 20, the hot gases exit through an exhaust stack 30 and are vented to the atmosphere. The gas turbine engine 12 draws intake gas 24 (e.g., oxidant such as ambient air) into the air compressor 14 through the air inlet housing 26 and the air duct 27. Although the illustrated embodiment depicts air 24, the intake gas 24 may include air, oxygen, oxygen-enriched air, oxygen-reduced air, exhaust recirculation gas (EGR), or any combination thereof. Nevertheless, the following discussion refers to air as a non-limiting example. As the intake air 24 enters the power generation facility 10, the intake air 24 first passes through the air inlet housing 26 (e.g., in the axial direction 13) that is coupled to the gas turbine engine 12. The air inlet housing 26 includes the duct 27 extending about an intake air passage, where the duct 27 includes opposite sidewall portions or panels 80, such as a top panel 82 and a bottom panel 84. The silencer baffles 28 are secured to the top and bottom panels 82, 84 as described in detail below. Inside the inlet air housing 26, an array of silencer baffles 28 is utilized as described in detail below. The silencer baffles 28 may also be utilized in a vent system 32, or other area of the gas turbine engine 12, where the temperature of the gases is low enough to utilize the silencer baffles 28 made of non-metallic materials (e.g., plastics, composites, etc.). In other embodiments, the silencer baffles 28 may be made of metallic materials, or metallic/non-metallic composite materials. In one example, the vent system 32 may include a fan 34 to reduce the temperature of the gases being vented through the vent system 32 such that the silencer baffles 28 can be used.

Figure 2:
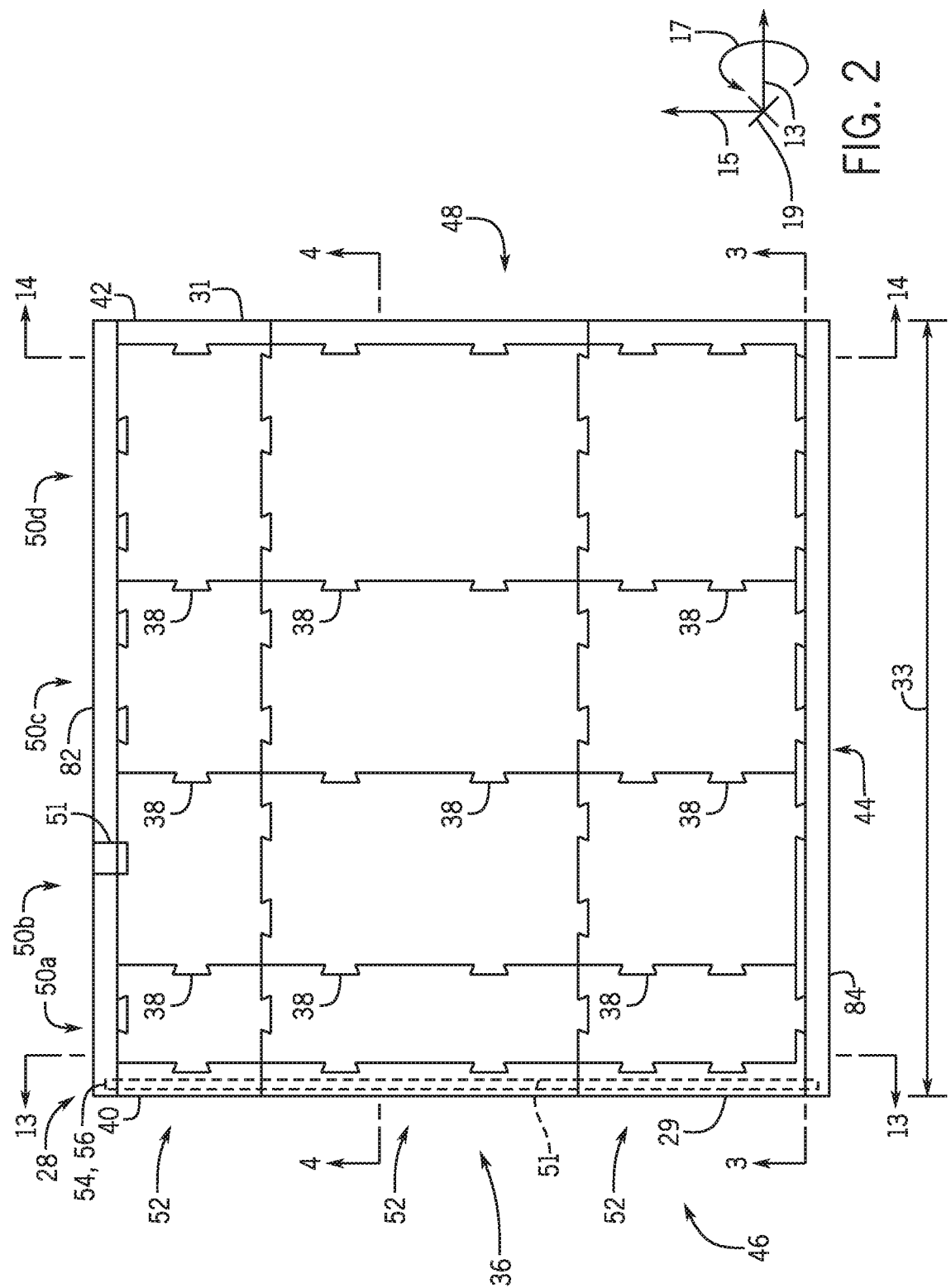
FIG. 2 is a schematic side view of an embodiment of an assembled silencer baffle of FIG. 1.

FIG. 2 is a schematic side view of an embodiment of an assembled silencer baffle 28 of FIG. 1. The silencer baffle 28 includes a plurality of baffle sections 36, which are coupled to adjacent baffle sections 36 via mating interlock structures 38. The mating interlock structures 38 may include mating rail portions, mating dovetail joints, mating hook and slot joints, mating latches, mating snap-fit couplings, or any combination thereof. The baffle sections 36 may include a leading edge section 40, a trailing edge section 42, and an intermediate section 44 disposed between the leading edge section 40 and the trailing edge section 42. The number of each of the baffle sections 36 may vary based in part on the dimensions (e.g., a length, a width, etc.) of the duct 27, the top panel 82, and/or the bottom panel 84. It may be appreciated that some exterior edges of the baffle sections 36 may not utilize the mating interlock features (see radial outermost edge of column 50b).

The intake air 24 flows through from an upstream portion or chamber 46 of the inlet air housing 26 to a downstream portion or chamber 48. As the intake air 24 flows through the inlet air housing 26, the air flow is improved by the more aerodynamic shape of the silencer baffle 28. The baffle sections 36 may include a contoured exterior surface between a leading edge 29 and a trailing edge 31 of the silencer baffle 28, thereby forming an airfoil shaped perimeter (see FIG. 13) of the silencer baffle 28. As explained in detail below, the baffle sections 36 may be arranged in columns 50 (e.g., stacked one over another in radial direction 15) and coupled together in rows 52 (e.g., interlocked in axial direction 13) via the mating interlock structures 38 (e.g., mating rail portions, mating dovetail joints, mating hook and slot joints, mating latches, mating snap-fit couplings, or any combination thereof). The mating interlock structures 38 may restrict the baffle sections 36 in the axial direction 13 and/or the radial direction 15. The columns 50 (e.g., 50a, 50b, etc.) and the rows 52 may be oriented in a grid, staggered, or arranged in any other suitable configuration.

It may be appreciated that at least one of the baffle sections 36 may be installed around the support structure 54. In some embodiments, the support structure 54 may be a rod 56 that is attached (e.g., threaded, bolted, welded) to the top panel 82 and the bottom panel 84. The rods 56 may constrain the panels 82, 84 and function as a load bearing element to reduce the load on the panels 82, 84. The rods 56 may be circular, square, rectangular, or any other suitable geometry. The rods 56 are disposed through rod support passages 51 to stabilize the columns 50 (e.g., the baffle sections 36). Though the rod 56 is shown disposed through the leading edge section 40, it may be appreciated that any of the baffle sections 36 (e.g., the trailing edge section 42, the intermediate section 44, etc.) may be secured to the panels 82, 84 via the rod 56. Still further, the rods 56 may be disposed at every other baffle section 36, every third baffle section 36, or any other suitable manner to secure the baffle section 36 to the panels 82, 84. The baffle sections 36 may include a first baffle portion 68 and a second baffle portion 70 (see FIGS. 4-11) that couple to the rod 56 as discussed in detail below. At least one of the baffle sections 36 may be coupled to the fluid conduit (e.g., duct 27) via one or more clamps 51. The clamps 51 may secure the baffle sections 36 to the panels 82, 84. The top most row 52 and the bottom most row 52 of the baffle sections 36 may be installed into the panels 82 and 84 via one or more rail guides 58, as explained with reference to FIG. 3.

FIG. 3 is a cross-sectional view of an embodiment of the panels 80 having a plurality of rail guides 58 disposed on an interior side of the fluid conduit (e.g., duct 27). The rail guides 58 may include a first rail guide disposed on a first side (e.g., the top panel 82) of the fluid conduit (e.g., duct 27) and/or a second rail guide disposed on a second side (e.g., the bottom panel 84) of the fluid conduit (e.g., duct 27). The rail guides 58 may help align the silencer baffle 28 in the fluid conduit so that the silencer baffles may remain substantially parallel to each other. The rail guides 58 may have an open end 60 and wherein the panel 80 is disposed along a top 82 or bottom 84 side of the inlet air housing 26 of FIG. 1 taken along line 3-3. In the illustrated embodiment, each rail guide 58 has an outer border or rim 62. Each rail guide 58 has a constant width 64 between the surrounding outer borders 62. In other words, the width 64 at the open end is substantially the same as the width 64 at a closed end 66. The rail guide 58 includes the open end 60, so that the baffle sections 36 (e.g., individual baffle sections 36, preassembled baffle sections 36) can be slid in a direction 19 into the rail guide 58. The columns 50 of the baffle sections 36 (and each entire silencer baffle 28) can then be further stabilized by inserting one or more rods 56 through the one or more baffle sections 36, as explained in further detail below. In the illustrated embodiment, the trailing edge section 42 and the intermediate section 44 may be coupled together first and then secured to the panels 82, 84. The leading section 40 may be installed around the rod 56 and coupled to the assembled trailing edge section 42 and the intermediate section 44. The assembly of the silencer baffle 28 may be further understood with reference to FIGS. 4-12.

FIGS. 4-12 illustrate the baffle sections 36 (e.g., the leading edge section 40, the trailing edge section 42, and the intermediate section 44) which each have a first baffle portion 68 and a second baffle portion 70. It may be appreciated that the baffle sections 36 for each section (the leading edge section 40, the trailing edge section 42, and the intermediate section 44) may have the same or different lengths relative to the other baffle sections 36 for the section. The baffle portions 68, 70 include an interior chamber 71. The first baffle portion 68 and the second baffle portion 70 include a first interior chamber or chamber portion 73 and a second interior chamber or chamber portion 75, respectively. The first and second baffle portions 68, 70 include a first sidewall 76 and a second sidewall 78 extending at least part of a distance 33 between the leading edge 29 and the trailing edge 31 of the silencer baffle 28. The first and second baffle portions 68, 70 include first and second baffle shell portions 67, 79 defined by the first and second side walls 76, 78, respectively. The length of the sidewalls 76, 78 in the axial direction 13 may vary based on the length of the silencer baffle 28. One or more sound absorption inserts 72, which are made of an acoustic damping material are disposed in the first interior chamber 73 of the first baffle portion 68 and in the second interior chamber 75 of the second baffle portion 70 of each of the baffle sections 36. The acoustic damping material may function as a sound absorption material. The acoustic damping material may include mineral woods, basalt wool, fiberglass, melamine foam, polyurethane foam, or other suitable materials. The sound absorption inserts 72 may be cut to a suitable shape and size and function as a noise attenuation component. Each of the sound absorption inserts 72 may have one or more openings 74. The opening 74 may be used to slide the sound absorption inserts 72 over a pair of mating joints 88 (e.g., a male joint 90 and a female joint 92) attached to the first baffle portion 68 and/or the second baffle portion 70 of the baffle sections 36. The mating joints 88 may include snap-fit joints, mating latches, mating hook in slot joints, mating interference fit joints, mating male and female threaded fasteners, mating non-threaded fasteners, mating tool-free fasteners (e.g., for coupling and uncoupling without the need for tools), mating clamps, mating straps, etc.

Figure 4:
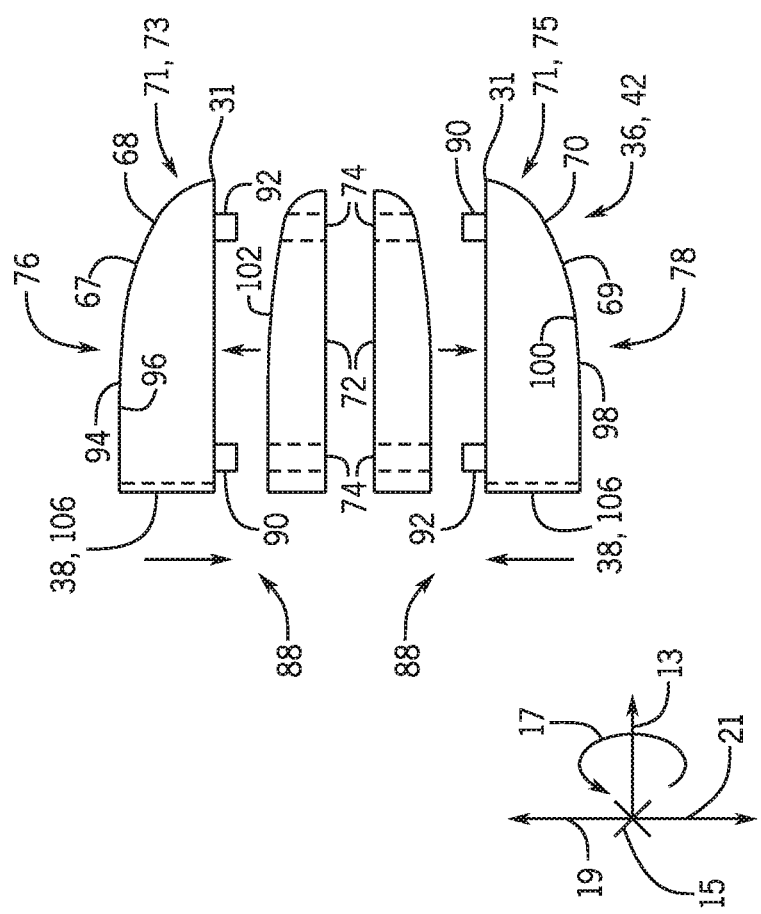
FIG. 4 is a cross-sectional view of an embodiment of a trailing edge section of the silencer baffle taken along line 4-4 of FIGS. 1-2 prior to assembly.

FIG. 4 is a cross-sectional view of an embodiment of the trailing edge section 42 of the silencer baffle 28 taken along line 4-4 of FIGS. 1-2 prior to assembly. The trailing edge section 42 includes a first baffle portion 68 and a second baffle portion 70. The first baffle portion 68 includes a first exterior surface 94 and a first interior surface 96 that are oriented opposite of each other. Similarly, the second baffle portion 70 has a first exterior surface 98 and a second interior surface 100 that are oriented opposite of each other. It may be appreciated that the first baffle section 68 and the second baffle section 70 may be produced by same injection mold. The exterior surfaces 94, 98 generally face away from one another and are exposed to the fluid flow in the fluid duct 27 when the silencer baffle 28 is assembled. The interior surfaces 96, 100 generally face toward one another when the first baffle portion 68 and the second baffle portion 70 are coupled together via the mating joints 88.

Before the first baffle portion 68 and the second baffle portion 70 are coupled together, a first insert 102 is inserted into the first chamber portion 73 of the first baffle portion 68 by sliding the first insert 102 in the direction 19 into the first chamber portion 71. A second insert 104 is inserted into the second chamber portion 75 of the second baffle portion 70 by sliding the second insert 104 in a direction 21 opposite the direction 19 into the second chamber portion 73. The openings 74 are used to slide the first insert 102 over the mating joints 88. The openings 74 may have a suitable shape to accommodate the mating joints 88. In the illustrated embodiment, the openings 74 are cylindrical to fit over the mating joints 88. It may be appreciated that the number of the mating joints 88 may vary depending on where the baffle section 36 is disposed in the assembled baffle 28, the type of baffle section 36 (e.g., the leading edge section 40, the trailing edge section 42, or the intermediate section 44), or other factors.

In some embodiments, the types of mating joints 88 may be alternated along the interior surface 96, 100 of the baffle section 36. For example, each baffle portion 68, 70 of each baffle section 36 may include a plurality of male joints 90 and/or female joints 92 (e.g., alternating distribution or sequence of male and female joints 90, 92), thereby defining a plurality of mating joints 88 along a perimeter (e.g., peripheral joints) or central area (e.g., central joints). For example, the first baffle portion 68 may have include the first male joint 90 adjacent to the first female joint 92 along the first interior surface 96 of the first baffle portion 68. The position of the mating joints 88 on the second baffle portion 70 may be determined in part by the position of the mating joints 88 on the first baffle portion 68. For example, the second female joint 92 on the second baffle portion 70 may be disposed across from the first baffle portion 68 to receive the first male joint 90 disposed on the first baffle portion 68 when the baffle portions 68, 70 are coupled together. The second male joint 90 may be disposed across from the first baffle portion 68 on the second baffle portion 70 to receive the first female joint 90 disposed on the first baffle portion 68 when the baffle portions 68, 70 are coupled together. When the mating joints 88 are coupled together, the first insert 102 and the second insert 104 are covered by the baffle portions 68, 70, as illustrated in FIG. 5.

Figure 5:
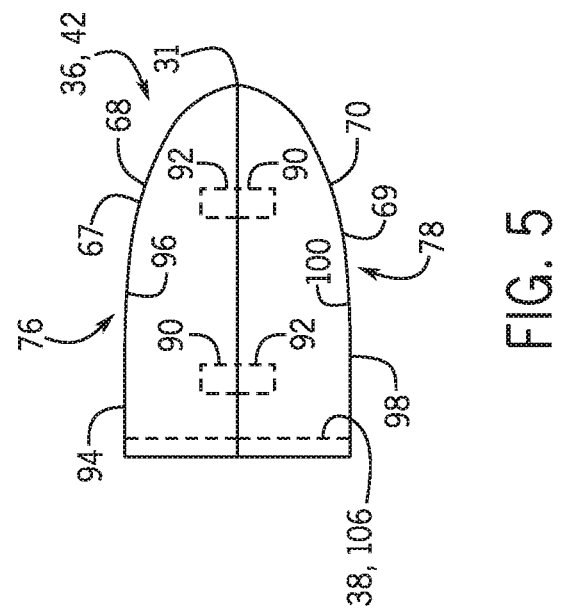
FIG. 5 is a cross-sectional view of an embodiment of the trailing edge section of the silencer baffle taken along line 4-4 of FIGS. 1-2 after assembly.

FIG. 5 is a cross-sectional view of an embodiment of the trailing edge section 42 of the silencer baffle 28 taken along line 4-4 of FIGS. 1-2 after assembly. When the male joints 90 are inserted into the female joints 92, the first baffle portion 68 and the second baffle portion 70 are coupled together forming the trailing edge section 42. The mating interlock structures 38 are indicated by a dashed line 106 and may be used to connect the trailing edge section 42 to the intermediate section 44. As described above, the mating interlock structure 38 may include mating rail portions, mating dovetail joints, mating hook and slot joints, mating latches, or any combination thereof. In some embodiments, the intermediate section 44 may be assembled before the trailing edge section 42 is coupled to the intermediate section 44.

FIG. 6 is a cross-sectional view of an embodiment of the intermediate section 44 of the silencer baffle 28 taken along line 4-4 of FIGS. 1-2 prior to assembly. As described above with reference to the trailing edge section 42, the intermediate section 44 includes the first baffle portion 68 and the second baffle portion 70. The first baffle portion 68 includes the first exterior surface 94 and the first interior surface 96 that are oriented opposite of each other. Similarly, the second baffle portion 70 includes the first exterior surface 98 and the second interior surface 100 that are oriented opposite of each other. The exterior surfaces 94, 98 generally face away from one another and are exposed to the fluid flow in the fluid conduit when the silencer baffle 28 is assembled. The interior surfaces 96, 100 generally face toward one another when the first baffle portion 68 and the second baffle portion 70 are coupled together via the mating joints 88. The mating joints 88 disposed closest to the edges along a perimeter of the baffle sections may be described as peripheral mating joints 89. The mating joints 88 disposed between the peripheral mating joints 89 in a central area may be described as central mating joints 91. The mating joints 88 illustrated in FIGS. 10-12 may be described in a similar manner in embodiments utilizing more than two mating joints 88.

As described above, the first insert 102 is inserted into the first baffle portion 68 by sliding the first insert 102 in the direction 19 into the first chamber portion 71. The second insert 104 is inserted into the second baffle portion 70 by sliding the second insert 104 in the direction 21 opposite the direction 19 into the second chamber portion 73. The openings 74 are used to slide the first insert 102 over the mating joints 88. As may be appreciated, the baffle portions 68, 70 may utilize 1, 2, 3, 4, 6, 7, 8, 9, 10, 15, 20, 30, or more mating joints 88 to couple together. In the illustrated embodiment, at least three pairs (or rows of multiple pairs) of mating joints 88 are used to couple the intermediate section 44 together.

The mating joints 88 are alternated between the male joints 90 and the female joints 92 along the interior surface 96, 100 of the baffle section 36 (e.g., the intermediate section 44). For example, the first baffle portion 68 may have include male joints 90 disposed on either side of the first female joint 92 along the first interior surface 96 of the first baffle portion 68. The position of the mating joints 88 on the second baffle portion 70 may be determined in part by the position of the mating joints 88 on the first baffle portion 68. For example, the female joints 92 on the second baffle portion 70 may be disposed across from the first baffle portion 68 to receive the male joints 90 disposed on the first baffle portion 68 when the baffle portions 68, 70 are coupled together. When the mating joints 88 are coupled together, the first insert 102 and the second insert 104 are covered by the baffle shell portions 67, 69 of the baffle portions 68, 70, as illustrated in FIG. 7. As may be appreciated, the baffle portions 68, 70 may utilize 1, 2, 3, 4, 6, 7, 8, 9, 10, 15, 20, 30 or more mating joints 88 to couple together.

FIG. 7 is a cross-sectional view of an embodiment of the intermediate section 44 of the silencer baffle 28 taken along line 4-4 of FIGS. 1-2 after assembly. FIG. 7 illustrates an embodiment of the intermediate section 44 of the silencer baffle 28 after assembly. When the male joints 90 are inserted into the female joints 92 (e.g., mating joints 88), the intermediate section 44 is coupled together to form the complete intermediate section 44. As illustrated, the male joints 90 and the female joints 92 may be alternated between the male joints 90 and the female joints 92 along either interior surface (e.g., the first interior surface 96, the second interior surface 100). The mating interlock structures 38 are indicated by a dashed line 106 and may be used to connect the intermediate section 44 to another intermediate section 44, the trailing edge section 42, and/or the leading edge section 40. In some embodiments, the intermediate section 44 may be assembled before the trailing edge section 42 is coupled to the intermediate section 44.

FIGS. 8-9 illustrate an embodiment of the assembly of the trailing edge section 42 and the intermediate section 44. FIG. 8 is a cross-sectional view of an embodiment of the trailing edge section 42 and the intermediate section 44 of the silencer baffle 28 taken along line 4-4 of FIGS. 1-2 before the trailing edge section 42 and the intermediate section 44 are coupled together via the mating interlock structures 38. As described above, the mating interlock structures 38 may include mating rail portions, mating dovetail joints, mating hook and slot joints, mating latches, mating snap-fit couplings, or any combination thereof. In one embodiment, the mating interlock structures 38 (e.g., the dovetail joints) may be inserted (e.g., slidingly coupled) together in the direction 21 to interlock with one another.

FIG. 9 is a cross-sectional view of an embodiment of the trailing edge section 42 and the intermediate section 44 of the silencer baffle 28 taken along line 4-4 of FIGS. 1-2 after the trailing edge section 42 and the intermediate section 44 are coupled together. The assembled baffle sections 42, 44 form a gradual curve (e.g., taper) from the intermediate baffle section 44 to the trailing section 42, creating a more aerodynamic shape (e.g., an airfoil shaped baffle). The baffle sections 36 may have patterns on exterior surfaces of the baffle sections 36. The patterns may include recesses and/or protrusions (e.g., dimples) and allow noise to be absorbed by acoustic materials (e.g., sound absorption materials) disposed within the baffle shell, as described below with reference to FIG. 19.

Figure 10:
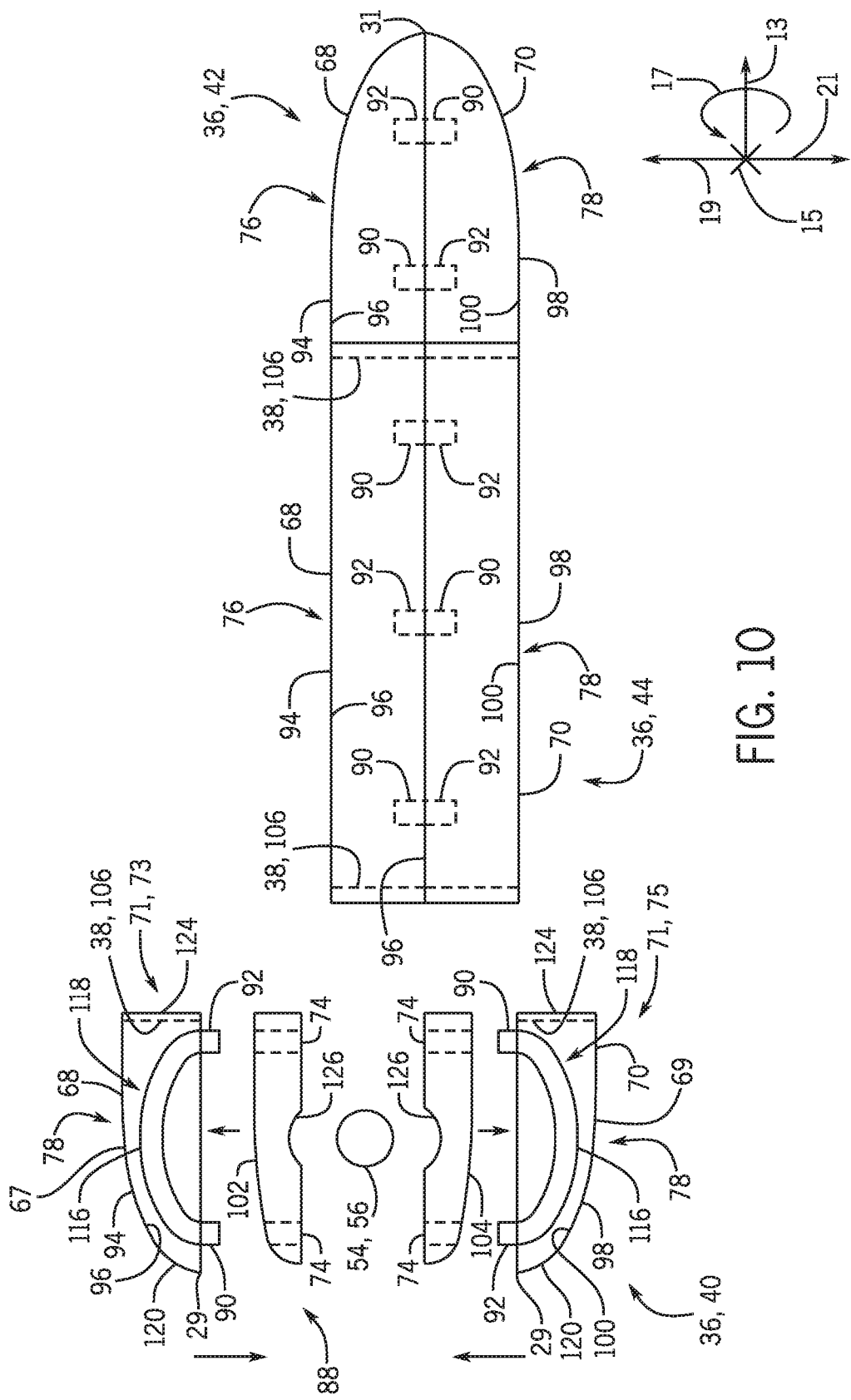
FIG. 10 is a cross-sectional view of an embodiment of a leading edge section of the silencer baffle taken along line 4-4 of FIGS. 1-2 before a first and a second baffle portion of the leading edge section have been coupled to the assembled intermediate section and trailing edge section of FIG. 9.

FIGS. 10-12 illustrate embodiments of the assembly of the leading edge section 40 of the silencer baffle 28. FIG. 10 illustrates is a cross-sectional view of an embodiment of the leading edge section 40 of the silencer baffle 28 taken along line 4-4 of FIGS. 1-2 before the first and the second baffle portions 68, 70 of the leading edge section 40 have been coupled to the assembled intermediate section 44 and trailing edge section 42 of FIG. 9. As described above, the leading edge section 40 (e.g., the first baffle portion 68, the second baffle portion 70) of the silencer baffle 28 may be coupled around the support structure 54 (e.g., the rod 56) in a crosswise direction (e.g., perpendicular or substantially perpendicular) relative to a longitudinal axis 57 of the support structure 54. Although only the leading edge section 40 is illustrated as utilizing the support structure 54 (e.g., the rod 56), it may be appreciated that other baffle sections 36 (e.g., the trailing edge section 42, the intermediate baffle section 44) may be assembled around a support structure 54 (e.g., the rod 56) disposed between the first and second baffle portions 68, 70 of the trailing edge section 42 and/or the intermediate baffle section 44. The trailing edge section 42 and the intermediate baffle section 44 may be installed into the rail guides 58 prior to installing the leading edge section 40, as described above with reference FIG. 3

When the support structure 54 is utilized between the first baffle portion 68 and the second baffle portion 70, the baffle portions 68, 70 may include a clamping plate 116 (e.g., a flexible plate). The clamping plate 116 may be used in both the first and second baffle portions 68 or either the first baffle portion 68 or the second baffle portion 70. The first and second clamping plates 116 extend in a plane generally crosswise to the longitudinal axis 57 of the support structure 54 (e.g., in the radial direction 15). The clamping plate 116 may be made from flexible materials such as plastics including acrylonitrile butadiene styrene, polypropylene, polyethylene, polyvinyl chloride, chlorinated polyvinyl chloride, or other suitable thermoplastic polymers material. The clamping plate 116 provides additional structural support for the support structure 54 (e.g., the rod 56). The clamping plate 116 includes a curved recess 118 that extends in the axial direction 30 between a first end 120 to a second end 124 of the baffle portions 68, 70. As may be appreciated, the curved recess 118 of the clamping plate 116 may serve as a clamp or receiving structure for the support structure 54 (e.g., the rod 56). The clamping plate 116 may enable thermal growth of the silencer baffle 28 independent from the duct 27 and from the panels 80. The material of the clamping plate 116 may enable thermal growth of the silencer baffle 28 based in part on the greater coefficient of thermal expansion of the plastic materials relative to the materials of the duct 27 and the rod 56. In some embodiments, the clamping plate 116 may be resilient and may be able to flex, thereby providing some spring force or the clamping plate 116 may be rigid.

The support structure 54 (e.g., the rod 56) may provide structural support to the duct 27 and the panels 80 (the top panel 82, the bottom panel 84). The support structure 54 (e.g., the rod 56) and the baffle 28 may reduce the load on the duct 27, in part due to the silencer baffles 28 being made from lighter materials (e.g., non-metallic materials such as plastics, composites). As such, the lighter materials may reduce the weight of the silencer baffles 28.

The first insert 102 and the second insert 104 may include recesses or curved openings 126 so that the first and second inserts 102, 104 fit around the support structure 54 (e.g., rod 56) when the first and second inserts 102, 104 are installed into the respective baffle portions 68, 70 as described below. As described above, the first insert 102 is inserted into the first chamber portion 73 of the first baffle portion 68 by sliding the first insert 102 in the direction 19. The second insert 104 is inserted into the second chamber portion 75 of the second baffle portion 70 by sliding the second insert 104 in the direction 21 opposite the direction 19. The openings 74 are used to slide the first insert 102 over the mating joints 88. The baffle portions 68, 70 may utilize 1, 2, 3, 4, 6, 7, 8, 9, 10, 15, 20, 30 or more mating joints 88 to couple together. As may be appreciated, the first baffle portion 68 or the second baffle portion 70 may be installed around the support structure 54 or the baffle portions 68, 70 may be installed simultaneously around the support structure 54.

As described above with reference to FIGS. 4-8, the first and second baffle portions 68, 70 may be coupled together via the mating joints 88. The number types of mating joints 88 may be alternated along the interior surface 96, 100 of the baffle section 36. For example, the first baffle portion 68 may have include the first male joint 90 adjacent to the first female joint 92 along the first interior surface 96 of the first baffle portion 68. The position of the mating joints 88 on the second baffle portion 70 may be determined in part by the position of the mating joints 88 on the first baffle portion 68. The second female joint 92 on the second baffle portion 70 may be disposed across from the first baffle portion 68 to receive the first male joint 90 disposed on the first baffle portion 68 when the baffle portions 68, 70 are coupled together. The second male joint 90 may be disposed across from the first baffle portion 68 on the second baffle portion 70 to receive the first female joint 90 disposed on the first baffle portion 68 when the baffle portions 68, 70 are coupled together. Although only two mating joints 88 are shown in the illustrated embodiment, it may appreciated that 1, 2, 3, 4, 5, 6, 7, 8, 9, 10, 15, 20, 30, or more mating joints 88 (e.g., male joint 90, female joint 92) may be utilized to couple the first and second baffle portions 68, 70 together.

FIG. 11 illustrates is a cross-sectional view of an embodiment of the leading edge section 40 of the silencer baffle 28 taken along line 4-4 of FIGS. 1-2 after the first baffle portion 68 of the leading edge section 40 has been coupled to the assembled intermediate section 44 and trailing edge section 42 of FIG. 9 partially around (e.g., one first side of) the support structure 54. In the illustrated embodiment, second baffle portion 70 is slid in the direction 19 towards the support structure 54 (e.g., the rod). The second baffle portion 70 is coupled to and around the support structure 54 (e.g., the rod 56) and to the assembled intermediate section 44 and trailing edge section 42. The dashed line 106 illustrates that the second baffle portion 70 is interlocked to the assembled intermediate section 44 and trailing edge section 42 via the mating interlock structures 38.

Next, the first baffle portion 68 is slid in the direction 21 towards the support structure 54 (e.g., the rod 56). The mating joints 88 may be coupled together (e.g., slidingly engaged or snap-fit together) such that the male joint 90 is inserted into the female joint 92 to assemble the first baffle portion 68 to the second baffle portion 70. When the mating joints 88 are coupled together, the first insert 102 and the second insert 104 are covered by the baffle shell portions 67, 69 of the baffle portions 68, 70. Still further, the first baffle portion 68 is coupled to the intermediate section 44 and the trailing edge section 42 via the mating interlock structures 38. The fully assembled silencer baffle 28 as described with reference to FIGS. 4-11 may be further understood with reference to FIG. 12.

FIG. 12 is a cross-sectional view an embodiment of the leading edge section 40 of the silencer baffle taken along line 4-4 of FIGS. 1-2 after the second baffle portion 70 of the leading edge section 40 has been coupled to the first baffle portion 68 and to the assembled intermediate section 44 and trailing edge section 42 of FIG. 9 around the support structure 54. As may be appreciated, several of the assembled silencer baffles 28 may be installed in the duct 27 between the panels 80. As described above, the silencer baffles 28 may also be utilized in a vent system 32, or other area of the gas turbine engine 12, where the temperature of the gases is low enough to utilize the silencer baffles 28 made of non-metallic materials (e.g., plastics, composites, etc.).

FIG. 13 is a cross-sectional view of an embodiment of the first baffle portion 68 of the leading edge section 40 of the silencer baffle 28 taken along line 13-13 of FIG. 2 illustrating the plurality of male and female joints 90, 92. In the leading edge section 40, the mating joints 88 (e.g., the male joint 90, the female joint 92) may be disposed between the flexible plates 116. It may be appreciated that any number (e.g., 1, 2, 3, 4, 5, 6 or more) of male and female joints 90, 92 may be disposed in the axial direction 13 along the first baffle portion 68. The number of male and female joints 90, 92 disposed on the first baffle portion 68 directly correlate to the number and orientation of male and female joints disposed on the second baffle portion 70. For example, the mating joints 88 disposed on the first baffle portion 68 and the second baffle portion 70 may be complementary, such that the male joints 90 are oriented across from the female joints 92 to slidingly engage with one another. The number and orientation of the mating joints 88 (e.g., the male joint 90, the female joint 92) may vary based in part on the desired structural support for the particular baffle section 36.

FIG. 14 is a cross-sectional view of an embodiment of the first baffle portion 68 of the trailing edge section 42 of the silencer baffle 28 taken along line 14-14 of FIG. 2 illustrating the plurality of male and female joints 90, 92. As described above, the number of male and female joints 90, 92 disposed on the first baffle portions 68 directly correlate to the number and orientation of male and female joints disposed on the second baffle portion 70. For example, the mating joints 88 disposed on the first baffle portion 68 and the second baffle portion 70 may be complementary such that the male joints 90 are oriented across from the female joints 92 to slidingly engage (e.g., snap-fit) with one another. It may be appreciated that any number (e.g., 1, 2, 3, 4, 5, 6 or more) of male and female joints 90, 92 may be disposed in the axial direction 13 along the first baffle portion 68.

In the trailing edge section 42, the mating joints 88 (e.g., the male joint 90, the female joint 92) may be coupled to a structural support or plate 130. The plates 130 may be made of a suitable material, such as the materials the flexible plates 116 are made from (e.g., acrylonitrile butadiene styrene, polypropylene, polyethylene, polyvinyl chloride, chlorinated polyvinyl chloride, or other suitable thermoplastic polymers material) or other suitable materials. However, the plates 130 may not have a curved structure 118 to receive the support structures 54. In embodiments where the support structure 54 is utilized in the trailing edge section 42, the flexible plate 116 may be utilized to support the support structure 54.

FIG. 15 is a partial cross-sectional view of an embodiment of the male and the female joints 90, 92 used to couple the baffle portions 68, 70 together. As described above, the mating joints 88 may include snap-fit joints, mating latches, mating hook in slot joints, mating interference fit joints, mating male and female threaded fasteners, mating non-threaded fasteners, mating tool-free fasteners (e.g., coupling and coupling without the need for tools), mating clamps, mating straps, etc. When the male joint 90 is inserted into the female joint 92, the mating joint 88 may be coupled together to form an interlocked coupling between the first and second baffle portions 68, 70. As illustrated, the male joint 90 has a protruding portion 108 with an enlarged head or boss portion 109 disposed on a narrow neck portion 110. The female joint 92 has a recess or opening 111 having a tapered bore 112 leading to lip or shoulder 112. The portion 109 snaps into engagement with shoulder 113.

FIG. 16 is a partial perspective view of a baffle section 36, illustrating integral locks 131 (e.g., snap-fit couplings) disposed on the interlock structures 38 (e.g., dovetail joints). In particular, the baffle section 36 has alternating male and female interlock portions 37 and 39 of the interlock structures 38, wherein the integral locks 131 have alternating first and second lock portions 132 and 133 (e.g., snap-fit coupling portions) on the respective interlock portions 37 and 39, respectively. In particular, the alternating male and female interlock portions 37 and 39 on the illustrated baffle section 36 are configured to interlock with corresponding female and male interlock portions 39 and 37 on an adjacent baffle section 36. Likewise, the first lock portion 132 disposed in each of the female interlock portions 37 of the illustrated baffle section 36 is configured to lock with (e.g., snap-fit with) the corresponding second lock portions 133 disposed on each of the male interlock portions 39 of an adjacent baffle section 36. Furthermore, the second lock portion 133 disposed on each of the male interlock portions 39 of the illustrated baffle section 36 is configured to lock with (e.g., snap-fit with) the corresponding first lock portions 131 disposed in each of the female interlock portions 37 of an adjacent baffle section 36. The integral locks 131 (e.g., mating first and second lock portions 132 and 133) are configured to secure (e.g., block release or separation of) the interlock structures 38 (e.g., mating female and male interlock portions 37 and 39) once coupled together. In the illustrated embodiment, the interlock portions 37 and 39 are mating female and male dovetail joints, while the lock portions 132 and 133 are mating snap-fit couplings.

As illustrated, the first lock portion 132 has a snap-fit recess or opening 134 disposed between opposite first and second tapered guides or ramps 136 and 138. Given that the baffle section 36 is an assembly of first and second baffle portions 68 and 70, the first ramp 136 is disposed on the first baffle portion 68 and the second ramp 138 is disposed on the second baffle portion 70. Furthermore, the opening 134 may be split or continuously formed by first and second opening portions 139 and 140 disposed on opposite sides of an interface 141 between the first and second baffle portions 68 and 70.

The second lock portion 133 has a snap-fit protrusion 142 configured to snap-fit into the snap-fit opening 134 of the first lock portion 131. In the illustrated embodiment, the snap-fit protrusion 142 has a first snap-fit tab 144 disposed on a first resilient arm 146 and a second snap-fit tab 148 disposed on a second resilient arm 150. Given that the baffle section 36 is an assembly of first and second baffle portions 68 and 70, the first resilient arm 146 having the first snap-fit tab 144 is disposed on the first baffle portion 68 and the second resilient arm 150 having the second snap-fit tab 148 is disposed on the second baffle portion 70.

FIG. 17 is a partial cross-sectional view of an embodiment of the integral lock 131 of FIG. 16, taken through line 17-17 to further illustrate details of the first lock portion 132 in the female interlock portion 37 of the interlock structure 38. As illustrated by arrow 152, as the male interlock portion 39 (e.g., male dovetail joint) slides into engagement with the female interlock portion 37 (e.g., female dovetail joint) of the mating interlock structures 38 of adjacent baffle sections 36, the second lock portion 133 also moves into engagement with the first lock portion 132. Accordingly, the snap-fit tabs 144 and 148 gradually slide along one of the ramps (e.g., the first ramp 136), the resilient arms 146 and 150 flex upwardly away from the ramps as the snap-fit tabs 144 and 148 approach the opening 134, and then the resilient arms 146 and 150 eventually bias (e.g., spring bias) the snap-fit tabs 144 and 148 into the opening 134 (e.g., opening portions 139 and 140) upon fully engaging the female and male interlock portions 37 and 39.

FIG. 18 is a partial cross-sectional view of an embodiment of the integral lock 131 of FIG. 16, further illustrating the first lock portion 132 in the female interlock portion 37 fully engaged with the second lock portion 133 on the male interlock portion 39. The details of the first lock portion 132 are the same as shown in FIG. 17, which is taken through line 17-17 of FIG. 16. FIG. 18 illustrates details of the second lock portion 133 as taken through line 18-18 of FIG. 16. As illustrated, the snap-fit tabs 144 and 148 are disposed within the opening 134 (e.g., opening portions 139 and 140), while the resilient arms 146 and 150 hold (e.g., inwardly bias) the positions of the snap-fit tabs 144 and 148. As a result, the snap-fit tabs 144 and 148 block separation or release of mating interlock structures 38 (e.g., female and male interlock portions 37 and 39, such that adjacent baffle sections 36 cannot move in opposite directions 154 and 156.

FIG. 19 is a close-up view of an embodiment of the exterior surface 94, 98 of one or more baffle sections 36 (e.g., leading edge section 40) of the silencer baffle 28. The baffle sections 36 may include various patterns 158 disposed on the exterior surface 94, 98 of the baffle sections 36. The patterns 158 also may provide recesses or openings through which the inlet air 24 is blown through. The pattern 158 disposed on the exterior surface 94, 98 of the leading edge section 40 includes a plurality of recesses or openings 160. The openings 160 may cover approximately 1 to 100%, 25 to 70%, 40 to 50%, and all percentages there between of the exterior surface 94, 98 of one or more baffle sections 36. The openings 160 enable the inlet air 24 to be exposed to the openings and allows noise to be absorbed by the sound absorption inserts 72 (e.g., the first insert 102, the second insert 104) disposed within the baffle portions 68, 70 as described above. The openings 160 may be disposed on any or all of the baffle sections 36, such as the leading edge section 40, the trailing edge section 42, and/or the intermediate sections 44. In the illustrated embodiment, the opening 160 may have a substantially square or rectangular shape. In other embodiments, the openings 160 may have other shapes including ovals, circles, triangles, hexagons, or combination thereof.

Figure 20:
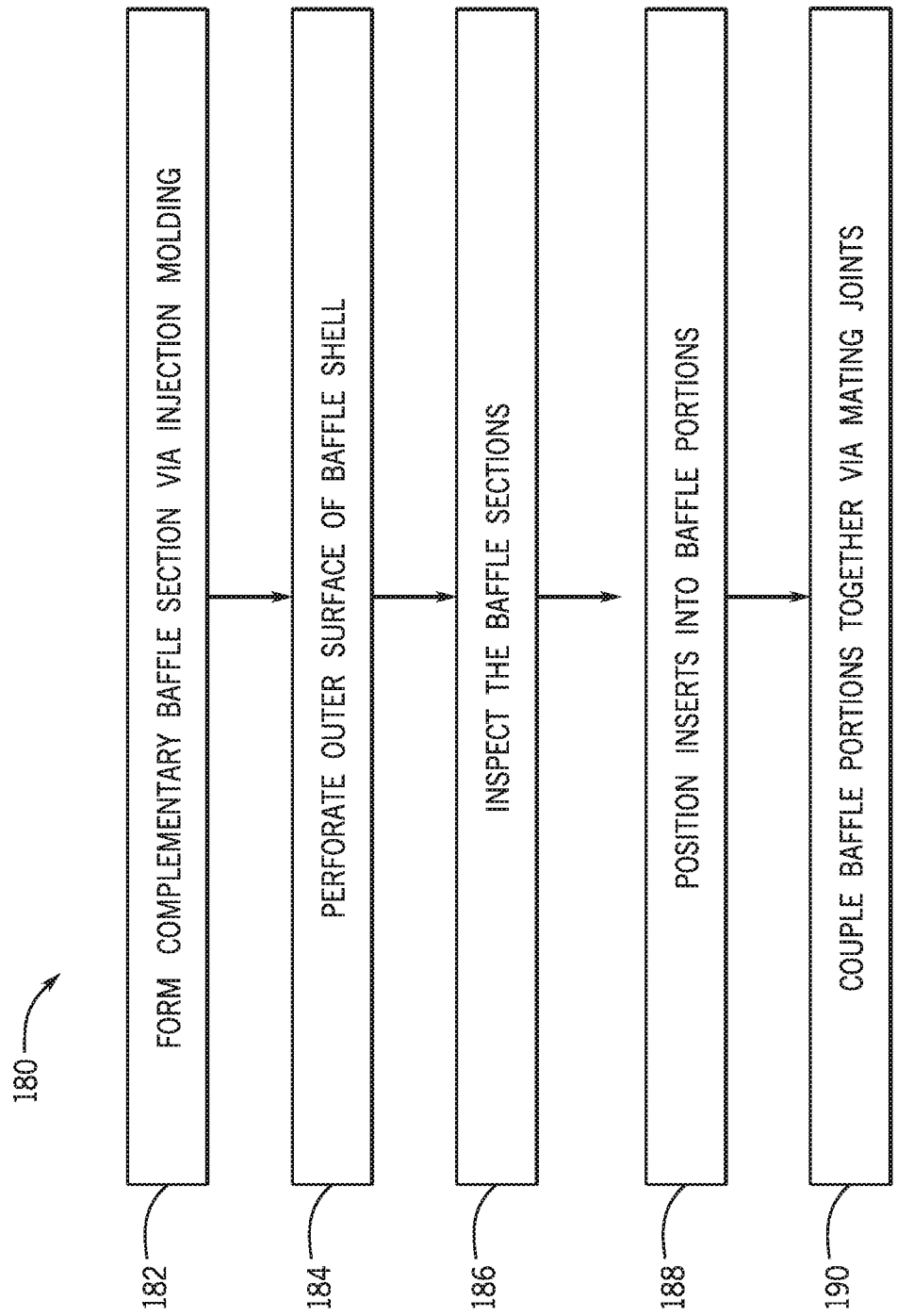
FIG. 20 illustrates a method of forming the silencer baffles in accordance with the embodiments disclosed herein.

FIG. 20 illustrates a method 180 of forming the silencer baffles 28 in accordance with the embodiments disclosed herein. The method 180 includes forming (block 182) complementary baffle sections 36 via injection molding. As described above, the baffle sections 36 include mating joints 88 (e.g., male joint 90, female joints 92) where the orientation of the mating joints 88 (e.g., male joint 90) may be determined in part by the position of the complementary mating joint 88 (e.g., female joint 92). The method 180 includes perforating (block 184) the exterior surface 94, 98 of the baffle sections 36 to allow noise to be absorbed. The perforations are also formed from the injection mold. The method 180 may include inspecting (block 186) the baffle sections 36 to ensure that the baffle sections 36 are suitable for use in the duct 27. The method 180 includes (block 188) positioning the sound absorption inserts 72 into the baffle portions 68, 70. As described above, the sound absorption inserts 72 may have openings 74 disposed in the sound absorption material to accommodate the mating joints 88.

The method 180 includes (block 190) coupling the baffle portions together via the mating joints 88.

FIG. 21 illustrates a method 200 of installing the silencer baffles 28 in accordance with the embodiments disclosed herein. The method 200 includes assembling (block 202) the trailing edge baffle section 42 together by coupling the baffle portions 68, 70 together. The method 200 includes assembling (block 204) the intermediate baffle section 44 together by coupling the baffle portions 68, 70 together. The method 200 includes coupling (block 206) the trailing edge baffle section 42 to the intermediate baffle section 44 together via the mating interlock features 38 (e.g., dovetail joints) to form an assembled trailing edge section and intermediate baffle section. The method 200 includes coupling (block 208) the support structure (e.g., the rod 56, pipe) to the duct, such as by welding or anchoring the support structure to the duct 27. The method 200 includes sliding (block 210) the assembled trailing edge and intermediate edge sections 42, 44 into the duct 27 via guides 58 in the duct panels 80 (e.g., the bottom panel 82, the top panel 84) or to an adjacent row of baffle sections. The method 200 includes coupling (block 212) the first portion of the leading edge baffle section 40 around the support structure 54 and to the assembled trailing edge and intermediate baffle sections 42, 44. The method 200 includes coupling (block 214) the second portion of the leading edge baffle section around the support structure 54 and to the assembled trailing edge and intermediate baffle sections 42, 44 to form an assembled silencer baffle 28. The method 200 includes continuing (block 216) to form the silencer baffles 28 as described herein until a desired number of silencer baffles is complete.

Technical effects of the claimed subject matter include forming baffle sections by coupling first and second baffle portions 68, 70 together via male and female mating joints 88. Sound absorption inserts 72 may be inserted into interior chambers 73, 75 of the baffle sections 68, 70 to absorb noise. One or more of the baffle sections 36 (e.g., the leading edge baffle section) may be formed around a support structure (e.g., a rod) which is secured to the duct panels 80. The baffle portions 68, 70 may form baffle sections 36 by coupling the mating joints 88 together to form each baffle section 36 (e.g., the leading edge baffle section 40, the trailing edge baffle section 42, and the intermediate section 44). The baffle sections 36 may be coupled together via mating interlock features 38. At least one of the baffle sections may utilize a support structure (e.g., rod) to reduce the load on the assembled silencer baffle.

This written description uses examples to disclose the claimed subject matter, including the best mode, and also to enable any person skilled in the art to practice the claimed subject matter, including making and using any devices or systems and performing any incorporated methods. The patentable scope of the claimed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a silencer baffle configured to mount in a fluid conduit along a fluid flow path, wherein the silencer baffle comprises:
a first baffle section having first and second baffle portions configured to couple together laterally about a support structure extending between opposite sides of the fluid conduit, wherein the first baffle portion has a first exterior surface opposite from a first interior surface, the second baffle portion has a second exterior surface opposite from a second interior surface, the first and second interior surfaces are configured to face toward one another about the support structure, and the first and second exterior surfaces are configured to face away from one another and the support structure in fluid contact with the fluid flow path.

2. The system of claim 1, wherein first and second baffle portions are configured to couple together in a crosswise direction relative to a longitudinal axis of the support structure, and the first and second exterior surfaces are configured to extend toward the opposite sides of the fluid conduit.

3. The system of claim 2, wherein the support structure comprises a support rod.

4. The system of claim 3, wherein the first baffle portion comprises one or more first curved recesses configured to receive only a first lateral side of the support rod, and the second baffle portion comprises one or more second curved recesses configured to receive only a second lateral side of the support rod, wherein the first and second lateral sides are on opposite sides of the longitudinal axis of the support rod.

5. The system of claim 4, wherein the one or more first recesses are disposed in one or more corresponding first flexible clamping plates spaced apart from one another in a first series along the longitudinal axis of the support rod, and the one or more second recesses are disposed in one or more corresponding second flexible clamping plates spaced apart from one another in a second series along the longitudinal axis of the support rod.

6. The system of claim 5, wherein the first and second baffle sections are coupled together via mating joints disposed on laterally opposite sides of the one or more first curved recesses and the one or more second curved recesses.

7. The system of claim 1, wherein the first baffle section comprises one or more first clamping plates and the second baffle section comprises one or more second clamping plates, wherein the first and second clamping plates are configured to clamp about the support structure and each of the first and second clamping plates extends in a plane generally crosswise to a longitudinal axis of the support structure.

8. The system of claim 1, wherein the first and second baffle sections are coupled together via mating joints without separate threaded fasteners.

9. The system of claim 8, wherein the mating joints comprise one or more pairs of a male joint disposed in a female joint, mating snap-fit joints, or a combination thereof.

10. The system of claim 1, wherein the first baffle section comprises a baffle shell disposed about an interior chamber and a sound absorption material disposed in the interior chamber, and the first baffle portion comprises a first baffle shell portion having a first chamber portion of the interior chamber, and the second baffle portion comprises a second baffle shell portion having a second chamber portion of the interior chamber.

11. The system of claim 1, wherein the first baffle section having the first and second baffle portions comprises a leading edge section of the silencer baffle, wherein a leading edge of the first baffle section is configured to extend toward the opposite sides of the fluid conduit.

12. The system of claim 1, wherein the silencer baffle comprises a second baffle section arranged linearly in a column with the first baffle section, and the second baffle section has third and fourth baffle portions configured to couple together laterally about the support structure.

13. The system of claim 1, wherein the silencer baffle comprises a second baffle section coupled to the first baffle section via first mating interlock structures, and a third baffle section coupled to the second baffle section via second mating interlock structures.

14. The system of claim 13, wherein the first baffle section comprises a leading edge section of the silencer having a first upstream end and a first downstream end, the second baffle section comprises an intermediate section of the silencer baffle having a second upstream end and a second downstream end, and the third baffle section comprises a trailing edge section of the silencer baffle having a third upstream end and a third downstream end, wherein the second upstream end is coupled to the first downstream end, wherein the third upstream end is coupled to the second downstream end.

15. The system of claim 14, wherein the first baffle section has the first and second baffle portions coupled together with first mating joints, the second baffle section has third and fourth baffle portions coupled together with second mating joints, and the third baffle section has fifth and sixth baffle portions coupled together with third mating joints.

16. The system of claim 1, comprising the fluid conduit having the support structure and at least one guide rail, wherein the silencer baffle is disposed along the guide rail.

17. The system of claim 1, comprising a turbine engine configured to couple to the fluid conduit having the silencer baffle.

18. A system, comprising:
a silencer baffle configured to mount in a fluid conduit along a fluid flow path, wherein the silencer baffle comprises a plurality of baffle sections comprising:
a leading edge baffle section having a first upstream end and a first downstream end;
an intermediate baffle section having a second upstream end and a second downstream end, wherein the second upstream end of the intermediate baffle section is configured to couple to the first downstream end of the leading edge baffle section with first mating interlock structures; and
a trailing edge baffle section having a third upstream end and a third downstream end, wherein the third upstream end of the trailing edge baffle section is configured to couple to the second downstream end of the intermediate baffle section with second mating interlock structures,
wherein at least one of the plurality of baffle sections comprises first and second baffle portions configured to couple together laterally about a support structure extending between opposite sides of the fluid conduit.

19. A method, comprising
coupling together first and second baffle portions of a first baffle section of a silencer baffle laterally about a support structure extending between opposite sides of a fluid conduit without separate threaded fasteners;
coupling together the first baffle section with a second baffle section via first mating interlock structures without separate threaded fasteners; and
coupling together the second baffle section with a third baffle section via second mating interlock structures without separate threaded fasteners.

20. The method of claim 19, comprising:
inserting the second and third baffle section in the fluid conduit after coupling together the second and third baffle sections via the second mating interlock structures; and
subsequently coupling together the first and second baffle portions laterally about the support structure via mating joints while simultaneously coupling together the first and second baffle sections via the first mating interlock structures.

* * * * *